US012713133B2

(12) United States Patent
Shabtay et al.

(10) Patent No.: US 12,713,133 B2
(45) Date of Patent: Aug. 18, 2026

(54) MULTI-APERTURE CAMERAS WITH AT LEAST ONE TWO STATE ZOOM CAMERA

(71) Applicant: Corephotonics Ltd., Tel Aviv (IL)

(72) Inventors: Gal Shabtay, Tel Aviv (IL); Ephraim Goldenberg, Tel Aviv (IL); Roy Rudnick, Tel Aviv (IL); Michael Dror, Tel Aviv (IL); Gil Bachar, Tel Aviv (IL); Emil Bronstein, Tel Aviv (IL); Itay Yedid, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/530,537

(22) Filed: Feb. 5, 2026

(65) Prior Publication Data

US 2026/0172686 A1 Jun. 18, 2026

Related U.S. Application Data

(63) Continuation of application No. 19/356,209, filed on Oct. 13, 2025, now Pat. No. 12,574,645, which is a (Continued)

(51) Int. Cl.
*H04N 23/69* (2023.01)
*G02B 13/02* (2006.01)
(Continued)

(52) U.S. Cl.
CPC ............ *H04N 23/69* (2023.01); *G02B 13/02* (2013.01); *G02B 15/143103* (2019.08);
(Continued)

(58) Field of Classification Search
CPC ............ H04N 5/23296; H04N 5/2253; H04N 5/2258; H04N 5/2178; H04N 5/23287;
(Continued)

(56) References Cited

U.S. PATENT DOCUMENTS 7,206,136 B2 * 4/2007 Labaziewicz .......... H04N 23/45 348/207.99
8,175,451 B2 * 5/2012 Ogino .................... G03B 13/02 396/296

(Continued)

*Primary Examiner* — Pritham D Prabhakher
(74) *Attorney, Agent, or Firm* — Nathan & Associates Patent Agents Ltd.; Menachem Nathan

(57) ABSTRACT

Multi-cameras and in particular dual-cameras comprising a Wide camera comprising a Wide lens and a Wide image sensor, the Wide lens having a Wide effective focal length $EFL_W$ and a folded Tele camera comprising a Tele lens with a first optical axis, a Tele image sensor and an OPFE, wherein the Tele lens includes, from an object side to an image side, a first lens element group G1, a second lens element group G2 and a third lens element group G3, wherein at least two of the lens element groups are movable relative to the image sensor along the first optical axis to bring the Tele lens to two zoom states, wherein an effective focal length (EFL) of the Tele lens is changed from $EFL_{T,min}$ in one zoom state to $EFL_{T,max}$ in the other zoom state, wherein $EFL_{Tmin}>1.5\times EFL_W$ and wherein $EFL_{Tmax}>1.5\times EFL_{Tmin}$.

20 Claims, 20 Drawing Sheets

Related U.S. Application Data continuation of application No. 19/208,765, filed on May 15, 2025, now Pat. No. 12,464,242, which is a continuation of application No. 19/037,313, filed on Jan. 27, 2025, now Pat. No. 12,335,622, which is a continuation of application No. 18/935,540, filed on Nov. 3, 2024, now Pat. No. 12,244,927, which is a continuation of application No. 18/744,650, filed on Jun. 16, 2024, now Pat. No. 12,167,135, which is a continuation of application No. 18/350,872, filed on Jul. 12, 2023, now Pat. No. 12,052,502, which is a continuation of application No. 18/167,985, filed on Feb. 13, 2023, now Pat. No. 11,743,587, which is a continuation of application No. 17/954,432, filed on Sep. 28, 2022, now Pat. No. 11,611,706, which is a continuation of application No. 17/717,083, filed on Apr. 10, 2022, now Pat. No. 11,477,386, which is a continuation of application No. 16/975,721, filed as application No. PCT/IB2020/050002 on Jan. 1, 2020, now Pat. No. 11,336,830.

(60) Provisional application No. 62/809,871, filed on Feb. 25, 2019, provisional application No. 62/787,826, filed on Jan. 3, 2019.

(51) Int. Cl.

*G02B 15/14* (2006.01)
*G03B 3/10* (2021.01)
*H04N 23/54* (2023.01)
*H04N 23/55* (2023.01)

(52) U.S. Cl.

CPC .............. *G03B 3/10* (2013.01); *H04N 23/54* (2023.01); *H04N 23/55* (2023.01)

(58) Field of Classification Search

CPC ............. H04N 5/23212; H04N 5/1211; H04N 5/2254; G02B 15/143103; G02B 13/02; G02B 13/009; G02B 13/0065; G03B 3/10; G03B 5/00; G03B 17/17; G03B 17/12; G03B 13/22

USPC .......................................................... 348/345

See application file for complete search history.

(56) References Cited

U.S. PATENT DOCUMENTS 9,223,118 B2* 12/2015 Mercado ............ G02B 13/0045
9,557,627 B2* 1/2017 Mercado ............ G02B 13/0045
10,338,344 B2* 7/2019 Mercado .................. G02B 9/34
2007/0114990 A1* 5/2007 Godkin .................. G01D 5/145 324/207.2
2010/0046074 A1* 2/2010 Wada ............. G02B 15/144113 359/557
2013/0033593 A1* 2/2013 Chinnock ................ A61B 3/14 348/78
2014/0063604 A1* 3/2014 Wada ................... G02B 27/646 359/557
2014/0218799 A1* 8/2014 Suzuka .............. G02B 13/0065 359/557
2015/0103417 A1* 4/2015 Nomura ............... G02B 13/005 359/733
2015/0215541 A1* 7/2015 Nomura ................. H04N 23/55 348/208.11
2015/0253647 A1* 9/2015 Mercado .............. G02B 13/007 359/708
2017/0276914 A1* 9/2017 Yao .................... G02B 13/0035
2018/0059365 A1* 3/2018 Bone .................. G02B 27/0025
2019/0235202 A1* 8/2019 Smyth ...................... G03B 5/00
2020/0221026 A1* 7/2020 Fridman ................ G02B 13/06

* cited by examiner

Y
Z
S1
S2
S3
S4
S5
S6
S7
S8
S9
S10
S11
S12
S13
S14
S15
S16
S17
S18
S19
G1
G2
G3
114'''
d4
d8
d16

L1
L2
L3
L4
L5
L6
L7
L8
114''
d4'
d8'
d16'
130
118

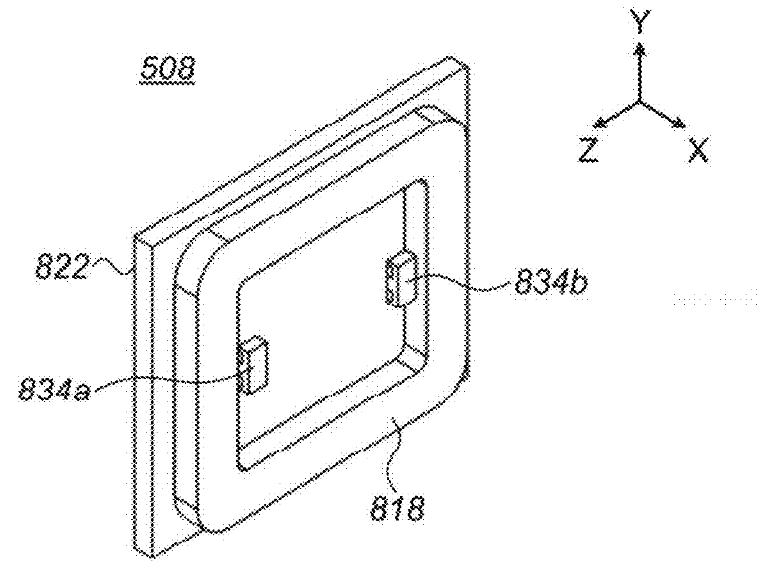
FIG. 8
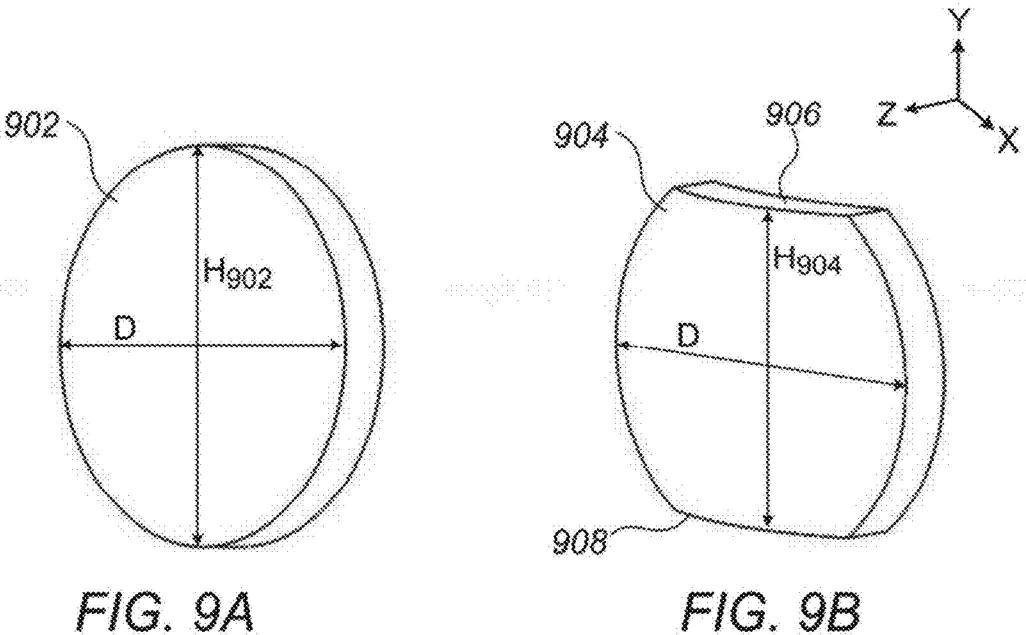
FIG. 9A
FIG. 9B

MULTI-APERTURE CAMERAS WITH AT LEAST ONE TWO STATE ZOOM CAMERA

CROSS REFERENCE TO RELATED APPLICATIONS

This is a continuation of U.S. patent application Ser. No. 19/356,209 filed Oct. 13, 2025 (now allowed), which was a continuation of U.S. patent application Ser. No. 19/208,765 filed May 15, 2025 (now U.S. Pat. No. 12,464,242), which was a continuation of U.S. patent application Ser. No. 19/037,313 filed Jan. 27, 2025 (now U.S. Pat. No. 12,335,622), which was a continuation of U.S. patent application Ser. No. 18/935,540 filed Nov. 3, 2024 (now U.S. Pat. No. 12,244,927), which was a continuation of U.S. patent application Ser. No. 18/744,650 filed Jun. 16, 2024 (now U.S. Pat. No. 12,167,135), which was a continuation of U.S. patent application Ser. No. 18/350,872, filed Jul. 12, 2023 (now U.S. Pat. No. 12,052,502), which was a continuation of U.S. patent application Ser. No. 18/167,985, filed Feb. 13, 2023 (now U.S. Pat. No. 11,743,587), which was a continuation of U.S. patent application Ser. No. 17/954,432, filed Sep. 28, 2022 (now U.S. Pat. No. 11,611,706) which was a continuation of U.S. patent application Ser. No. 17/717,083 filed Apr. 10, 2022 (now U.S. Pat. No. 11,477,386), which was a continuation of U.S. patent application Ser. No. 16/975,721 filed Aug. 26, 2020 (now U.S. Pat. No. 11,336,830), which was a 371 application from international patent application PCT/IB2020/050002 filed on Jan. 1, 2020, which claims priority from U.S. Provisional Patent Applications No. 62/787,826 filed on Jan. 3, 2019, and No. 62/809,871 filed on Feb. 25, 2019, both of which are expressly incorporated herein by reference in their entirety.

FIELD

Embodiments disclosed herein relate in general to digital cameras, and more particularly, to dual-aperture zoom digital cameras with a folded zoom lens.

BACKGROUND

Compact multi-aperture and in particular dual-aperture (also referred to as "dual-lens" or "dual-camera") digital cameras are known. Miniaturization technologies allow incorporation of such cameras in compact portable electronic devices such as tablets and mobile phones (the latter referred to hereinafter generically as "smartphones"), where they provide advanced imaging capabilities such as zoom, see e.g. co-owned PCT patent applications No. PCT/IB2015/056004, which is incorporated herein by reference in its entirety. Such cameras and/or cameras disclosed herein are cameras with strict height limitation, normally of less than 1 cm, the thinner the better.

Dual-aperture zoom cameras in which one camera has a wide field of view $FOV_W$ (referred to as "Wide camera") and the other has a narrower, "telephoto" $FOV_T$ (referred to as "Tele camera") are known. A Tele camera is required to have dimensions as small as possible in order to fit the thickness of the device in which the camera is installed (preferably without protruding from the device's casing), while being suitable to operate with commonly used image sensors. This problem is even more crucial when using a Tele lens with a long (Tele) effective focal length (EFL) to obtain a relatively high zooming effect. As known, the term "EFL" as applied to a lens refers to the distance from a rear principal plane to a paraxial focal plane. The rear principal plane is calculated by tracing an on-axis parabasal ray from infinity and determined using the parabasal's image space marginal ray angle.

Dual-aperture zoom cameras comprising an upright Wide camera and a folded Tele camera are also known, see. e.g. co-owned U.S. Pat. No. 9,392,188. The Wide camera is an "upright" camera comprising a Wide image sensor (or simply "sensor") and a Wide lens module that includes a Wide fixed focus lens assembly (or simply "lens") with a Wide lens symmetry axis. The folded Tele camera comprises a Tele image sensor and a Tele lens module that includes a Tele fixed focus lens with a Tele lens symmetry axis. The dual-aperture zoom camera further comprises a reflecting element (also referred to as optical path folding element or "OPFE") that folds light arriving from an object or scene along a first optical path to a second optical path toward the Tele image sensor. The first and second optical paths are perpendicular to each other. The Wide lens symmetry axis is along (parallel to) the first optical path and the Tele lens symmetry axis is along the second optical path. The reflecting element has a reflecting element symmetry axis inclined substantially at 45 degrees to both the Wide lens symmetry axis and the Tele lens symmetry axis and is operative to provide a folded optical path between the object and the Tele image sensor.

The Wide lens has a Wide field of view ($FOV_W$) and the Tele lens has a Tele field of view ($FOV_T$) narrower than $FOV_W$. In an example, the Tele camera provides a ×5 zooming effect, compared to the Wide camera.

Compact folded cameras with lens assemblies that include a plurality of lens elements divided into two or more groups, with one or more ("group") of lens elements movable relative to another lens element or group of lens elements, are also known. Actuators (motors) used for the relative motion include step motors with screws or piezoelectric actuators. However, a general problem with such cameras is that their structure dictates a rather large F number (F #) of 3 and more, with F #increasing with the zoom factor. Their actuators are slow and noisy (piezoelectric) or bulky (stepper motors), have reliability problems and are expensive. Known optical designs also require a large lens assembly height for a given F # for the two extreme zoom states obtained in such cameras.

SUMMARY

In exemplary embodiments, there are provided dual-cameras comprising: a Wide camera comprising a Wide lens and a Wide image sensor, the Wide lens having a Wide effective focal length $EFL_W$; and a folded Tele camera comprising a Tele lens with a first optical axis, a Tele image sensor (or simply "Tele sensor") and an OPFE, wherein the Tele lens includes, from an object side to an image side, a first lens element group G1, a second lens element group G2 and a third lens element group G3, wherein at least two of the lens element groups are movable relative to the Tele sensor along the first optical axis to bring the Tele lens to two zoom states, wherein an effective focal length of the Tele lens is changed from a value $EFL_{T,min}$ in one zoom state to a value $EFL_{T,max}$ in the other zoom state, wherein $EFL_{Tmin}>1.5\times EFL_W$ and wherein $EFL_{Tmax}>1.5\times EFL_{Tmin}$.

The Wide lens has a second optical axis, the second optical axis being perpendicular to the first optical axis.

In some exemplary embodiments, the Tele camera is configured to focus by shifting G1, G2 and G3 relative to each other, in both the first and the second zoom states.

In some exemplary embodiments, G1, G2 and G3 are arranged from the object side to the image side, wherein G1 has a positive refractive power, G2 has a positive refractive power and G3 has a negative refractive power.

In some exemplary embodiments, the at least two movable lens element groups include G1 and G3, wherein G1 and G3 are movable relative to the Tele sensor and to G2 and wherein G2 is stationary relative to the Tele sensor. In some embodiments, G3 may further be movable for focus relative to the Tele sensor, G1 and G2. In some embodiments, G1 may further be movable for focus relative to the Tele sensor, G2 and G3.

In an exemplary embodiment, a first lens element L1 toward the object side has a clear aperture (CA) value (or simply "clear aperture") larger than clear apertures of all other lens elements in the Tele lens.

In an exemplary embodiment, the Tele lens has a total track length ($TTL_T$) and a maximum TTL ($TTL_{Tmax}$) fulfills the condition $TTL_{Tmax}<EFL_{Tmax}$.

In an exemplary embodiment, the Tele lens has a total track length ($TTL_T$) and a maximum TTL ($TTL_{Tmax}$) fulfills the condition $TTL_{Tmax}<0.9\times EFL_{Tmax}$.

In an exemplary embodiment, the Tele lens has a Tele lens f-number ($F\#_T$) and a minimal value of $F\#_T$ ($F\#_{Tmin}$) fulfills the condition $F\#_{Tmin}<1.5\times F\#_{Tmax}\times EFL_{Tmin}/EFL_{Tmax}$.

In an exemplary embodiment, the Tele lens has a Tele lens f-number ($F\#_T$) and a minimal value of $F\#_T$ ($F\#_{Tmin}$) and a maximal value of $F\#_T$ ($F\#_{Tmax}$) fulfill the condition $F\#_{Tmin}<1.8\times F\#_{Tmax}\times EFL_{Tmin}/EFL_{Tmax}$.

In an exemplary embodiment, the Tele lens has a Tele lens f-number ($F\#_T$) and a minimal value of $F\#_T$ ($F\#_{Tmin}$) and a maximal value of $F\#_T$ ($F\#_{Tmax}$) fulfill the condition $F\#_{Tmin}<1.2\times F\#_{Tmax}\times EFL_{Tmin}/EFL_{Tmax}$.

In an exemplary embodiment, for any lens element group, the movement from the first zoom state to the second zoom state has a stroke smaller than $0.75\times(EFL_{Tmax}-EFL_{Tmin})$.

In an exemplary embodiment, for any lens element group, the movement from the first zoom state to the second zoom state has a stroke smaller than $0.6\times(EFL_{Tmax}-EFL_{Tmin})$.

In an exemplary embodiment, first lens element L1 is a cut lens element.

In some exemplary embodiments, the at least two movable lens element groups include lens element groups G1, G2 and G3, wherein G1 and G3 are movable as one unit relative to the Tele sensor and to G2 in a given range $R_{1,3}$ and wherein G2 is movable relative to the Tele sensor in a range $R_2$ smaller than $R_{1,3}$. In an exemplary embodiment, G1, G2 and G3 are movable toward the image side. In some exemplary embodiments, G1, G2 and G3 are movable for focusing relative to the Tele sensor as one unit.

In some exemplary embodiments, $EFL_{Tmin}$=15 mm and $EFL_{Tmax}$=30 mm.

In some exemplary embodiments, $EFL_{Tmin}$=13 mm and $EFL_{Tmax}$=26 mm.

In some exemplary embodiments, at the two zoom states, wherein $R_{AF}$ is a maximal range of movement of G2 required for focus between infinity and 1 meter, $R_{AF}<0.4\times R_2$. In some exemplary embodiments, at the two zoom states, wherein $R_{AF}$ is a maximal range of movement of G1 and G3 required for focus between infinity and 2 meter, $R_{AF}<0.4\times R_{1,3}$.

In some exemplary embodiments, actuation for the movement of G2 is performed in close loop control.

In some exemplary embodiments, actuation for the movement of G1 and G3 is performed in open loop control.

In some exemplary embodiments, the movement of G1, G2 and G3 is created using voice coil motor (VCM) mechanisms.

In some exemplary embodiments, the movement of G1, G2 and G3 is guided along the first optical axis by a ball guided mechanism that creates a linear rail. In some exemplary embodiments, the ball guided mechanism includes at least one groove on a G2 lens carrier, at least one groove on a G1+G3 lens carrier, and a plurality of balls between the grooves on the G2 lens carrier and the G1+G3 lens carrier.

In an exemplary embodiment, there is provided a dual-camera comprising: a Wide camera comprising a Wide lens and a Wide image sensor, the Wide lens having a Wide effective focal length $EFL_W$; and a folded Tele camera comprising a Tele lens with a first optical axis, a Tele sensor and an OPFE, wherein the Tele lens includes, from an object side to an image side, a first lens element group G1, a second lens element group G2 and a third lens element group G3, wherein G1 and G3 are movable along the first optical axis as one unit relative to the Tele sensor and G2 in a given range $R_{1,3}$, wherein G2 is movable along the first optical axis relative to the Tele sensor in a range $R_2$ smaller than $R_{1,3}$, wherein the combined movements of G1, G2 and G3 bring the Tele lens to two zoom states, wherein an EFL of the Tele lens is changed from $EFL_{T,min}$ in one zoom state to $EFL_{T,max}$ in the other zoom state and wherein $EFL_{Tmin}>EFL_W$ and wherein $EFL_{Tmax}>1.5\times EFL_{Tmin}$.

In an exemplary embodiment, there is provided a folded camera comprising: a lens with a first optical axis, an image sensor and an OPFE, wherein the lens includes, from an object side to an image side, a first lens element group G1, a second lens element group G2 and a third lens element group G3, wherein G1 and G3 are movable along the first optical axis as one unit relative to the image sensor and G2 in a given range $R_{1,3}$, wherein G2 is movable along the first optical axis relative to the image sensor in a range $R_2$ smaller than $R_{1,3}$, wherein the combined movements of G1, G2 and G3 bring the lens to two zoom states, wherein an EFL of the lens is changed from a value $EFL_{,min}$ in one zoom state to a value $EFL_{Tmax}$ in the other zoom state and wherein $EFL_{max}>1.5\times EFL_{min}$.

In an exemplary embodiment, there is provided a triple-camera, comprising: a Wide camera comprising a Wide lens and a Wide image sensor, the Wide lens having a Wide effective focal length $EFL_W$, an Ultra-Wide camera comprising an Ultra-Wide lens and an Ultra-Wide image sensor, the Ultra-Wide lens having an Ultra-Wide effective focal length $EFL_{UW}$, and a folded Tele camera comprising a Tele lens with a first optical axis, a Tele sensor and an OPFE, wherein the Tele lens includes, from an object side to an image side, a first lens element group G1, a second lens element group G2 and a third lens element group G3, wherein at least two of the lens element groups are movable relative to the Tele sensor along the first optical axis to bring the Tele lens to two, first and second zoom states, wherein an EFL of the Tele lens is changed from a value $EFL_{T,min}$ in the first zoom state to a value $EFL_{T,max}$ in the second zoom state, wherein $EFL_{Tmin}>2\times EFL_{UW}$, wherein $EFL_{Tmin}>1.5\times EFL_W$ and wherein $EFL_{Tmax}>1.5\times EFL_{Tmin}$.

In an exemplary embodiment, there is provided a dual-camera module comprising: a Wide camera module, and a Tele camera module comprising a lens module, a lens actuator for moving the lens module between a first and a second zoom state, and a memory for storing first and a second calibration data, wherein the first calibration data may comprise calibration data between the Wide camera module and the Tele camera module in a first zoom state, and wherein the second calibration data may comprise calibration data between the Wide camera module and the Tele camera module in a second zoom state.

In various exemplary embodiments, there is provided a system comprising: an application processor (AP), a Wide camera module for providing first image data, a Tele camera module for providing second image data, the Tele camera module comprising a lens module, and a lens actuator for moving a lens module between a first and a second zoom state, and a memory for storing a first and a second calibration data, wherein the first calibration data may comprise calibration data between the Wide camera module and the Tele camera module in the first zoom state and second calibration data between the Wide camera module and the Tele camera module in the second zoom state, and wherein the AP is configured to generate third image data by processing the first and second image data and by using the first calibration data when the Tele camera module is in the first zoom state and the second calibration data when the Tele camera module is in the second zoom state.

In an embodiment of the system, the first calibration data is stored in the first camera module, and the second calibration data is stored in the second camera module.

In an embodiment of the system, the first calibration data and the second calibration data are stored only in the Tele camera module.

In an embodiment of the system, the first calibration data and the second calibration data are stored only in the Wide camera module.

In an embodiment of the system, the first calibration data and the second calibration data are stored in a memory not located in the Wide camera module or in the Tele camera module.

In an embodiment of the system, a first portion of the first calibration data and a first portion of the second calibration data are stored in a memory located in the Wide camera module or in the Tele camera module, and a second portion of the first calibration data and a second portion of the second calibration data are stored in a memory not located in the Wide camera module or in the Tele camera module.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify embodiments disclosed herein and should not be considered limiting in any way. In the drawings:

FIG. 8 shows an electronic sub-assembly in the Tele lens and sensor module of FIG. 5;

FIG. 9A shows a lens element having axial symmetry;

FIG. 9B shows a cut lens element with two cuts;

DETAILED DESCRIPTION

Figure 1A:
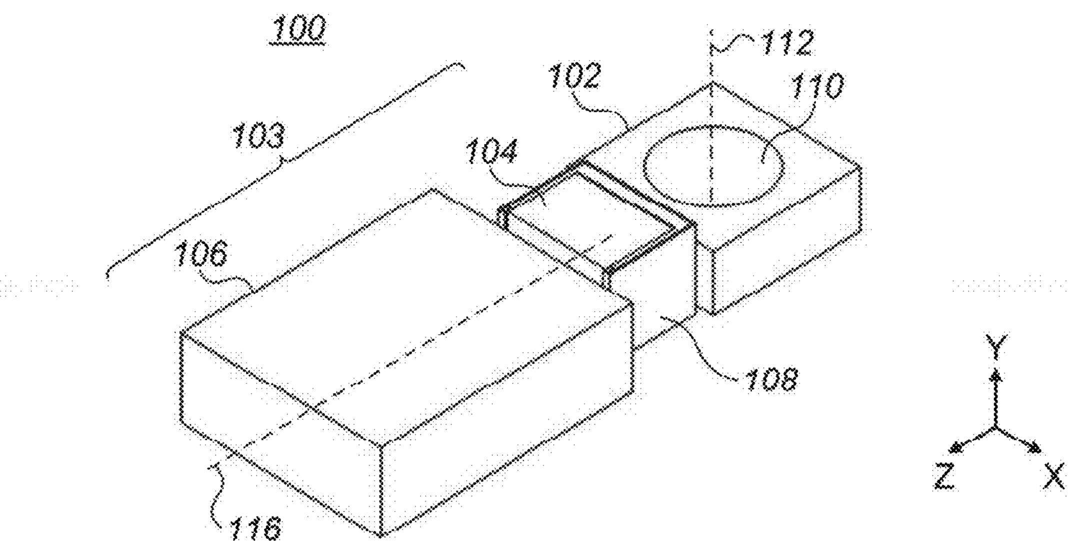
FIG. 1A shows schematically a general perspective view of a dual-camera, comprising an upright camera and a zoom folded camera.
Figure 1B:
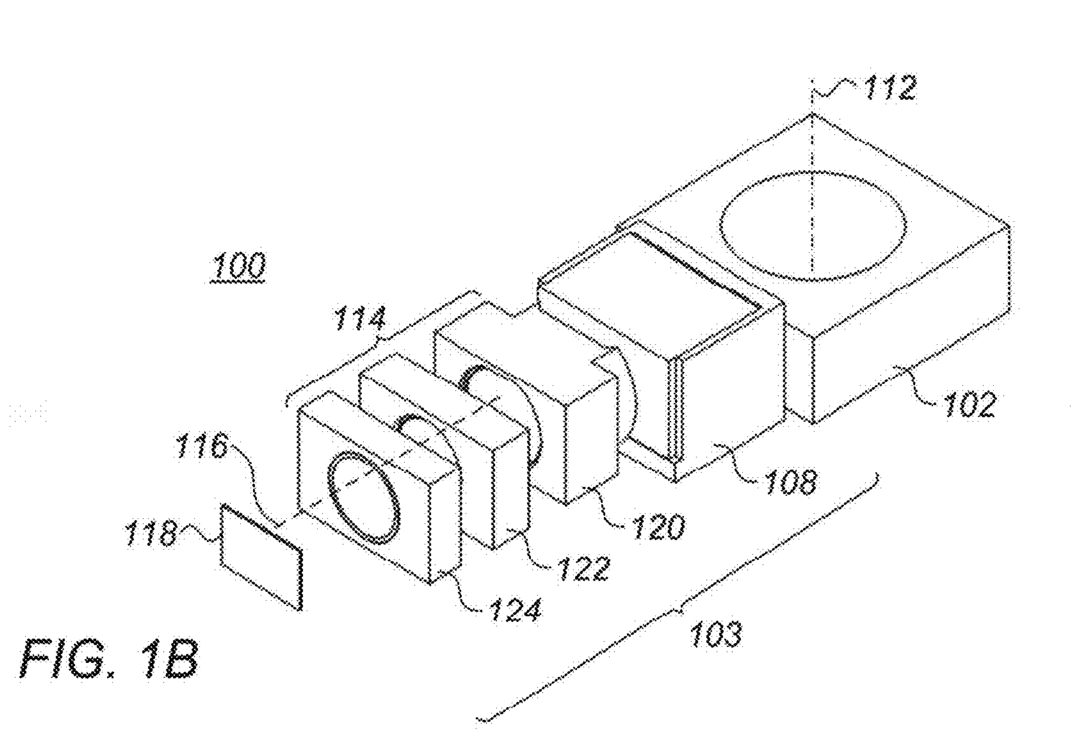
FIG. 1B shows the dual-camera of FIG. 1A in an exploded view.

FIG. 1A shows schematically a general perspective view of an embodiment of a dual-camera numbered 100, comprising an upright Wide camera 102, and a folded Tele camera 103 comprising an OPFE 104 (e.g. a prism), and a zoom folded Tele camera lens and sensor module (or simply "module") 106. Wide camera includes a Wide lens 110 with a fixed effective focal length $EFL_W$. For example, $EFL_W$ may be 2-5 mm. In Tele camera 103, OPFE 104 is held in a prism holder 108. Module 106 includes a shield 107. Shield 107 may cover some or all elements of module 106 or camera 103. FIG. 1B shows dual-camera 100 with shield 107 removed and with more details. Module 106 further includes a Tele lens 114 with a Tele lens optical axis 116, a Tele sensor 118, and, optionally, a glass window 130 (see e.g. FIG. 2A). Glass window 130 may be used for filtering light at infra-red (IR) wavelengths, for mechanical protection of sensor 118 and/or for protection of sensor 118 from dust. For simplicity, the word "Tele" used with reference to the camera, lens or image sensor may be dropped henceforth. In some embodiments, the lens and image sensor modules are separated, such that the Tele sensor has its own module, while other functionalities and parts described below (in particular lens actuator structure 502 of FIGS. 5A-E) remain in a Tele camera lens module only. The entire description below refers to such embodiments as well. In other embodiments, a system described herein may comprise one or mode additional cameras, forming e.g. a triple-camera system. Besides a Wide and a Tele camera, a triple-camera may include also an Ultra-Wide camera, wherein an Ultra-Wide camera EFL, $EFL_{UW}<0.7\times EFL_W$.

Dual-camera 100 further comprises, or is coupled to, a controller (not shown) that controls various camera functions, including the movement of lens groups and elements described below.

Lens 114 includes three groups of lens elements G1, G2 and G3, housed respectively in a first group (G1) lens housing (or "holder") 120, a second group (G2) lens housing 122 and a third group (G3) lens housing 124. Details of three different lens designs for lens element groups G1, G2 and G3 are provided below with reference to FIGS. 2-4. In various embodiments described in detail next, at least one lens element group moves relative to another lens element group along lens optical axis 116 to provide at least two Tele lens effective focal lengths $EFL_T$: a minimum $EFL_{Tmin}$ and a maximum $EFL_{Tmax}$. For example, $EFL_{Tmin}$ may be 10-20 mm and $EFL_{Tmax}$ may be 20-40 mm. This provides zoom capability between two large EFLs while keeping a small Tele lens f-number ($F\#_T$). In addition, $EFL_{Tmin}$ is larger than the $EFL_W$, for example by 2 times or more, such that optical zoom may be provided by dual-camera 100 between $EFL_W$ and $EFL_{Tmax}$. In addition for EFL, for each zoom state a Tele lens total track length ($TTL_T$) is defined as the distance along the optical axis from the first surface of the first lens element toward the object side ($S_1$, see below) to the image sensor surface, when the lens is focused at infinity, and including all lens elements and the glass window. $TTL_{Tmin}$ is defined for the first zoom state and $TTL_{Tmax}$ is defined for the second zoom state. $TTL_{Tmin}$ and $TTL_{Tmax}$ are marked for example in FIGS. 2C, 2D, 3A and 3B, but the definitions apply for all embodiments in this application.

Figure 2A:
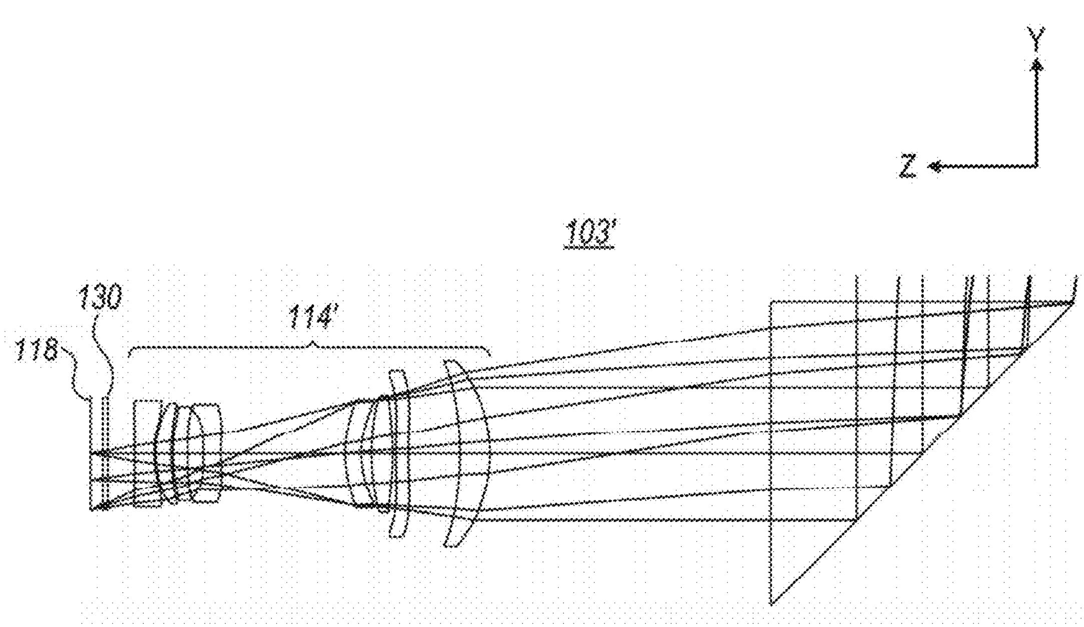
FIG. 2A shows a zoom folded camera as in FIGS. 1A and 1B with a first lens optical design in a first zoom state and with ray tracing.
Figure 2B:
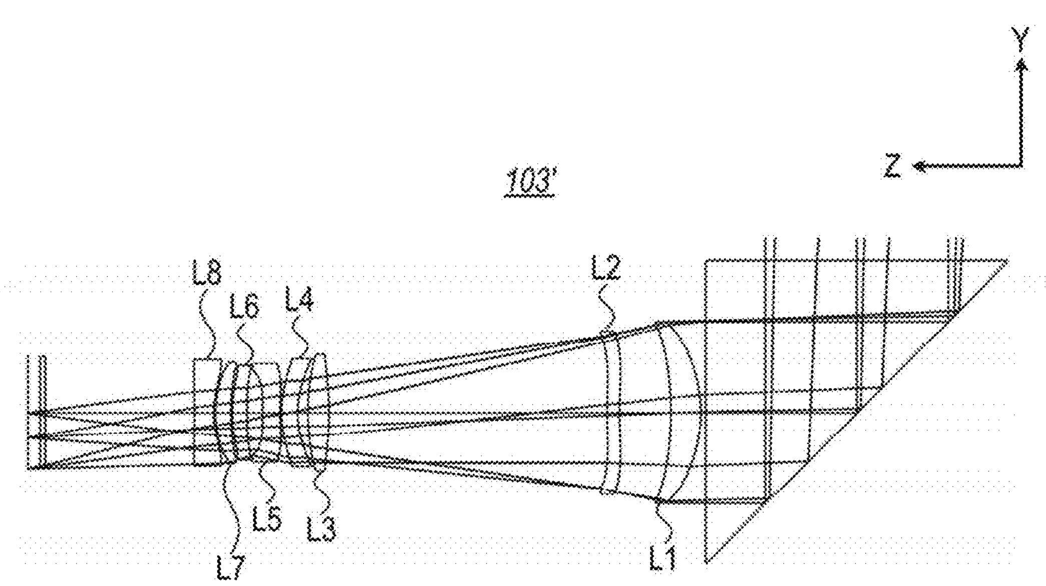
FIG. 2B shows a zoom folded camera as in FIGS. 1A and 1B with the first lens optical design in a second zoom state and with ray tracing.
Figure 2C:
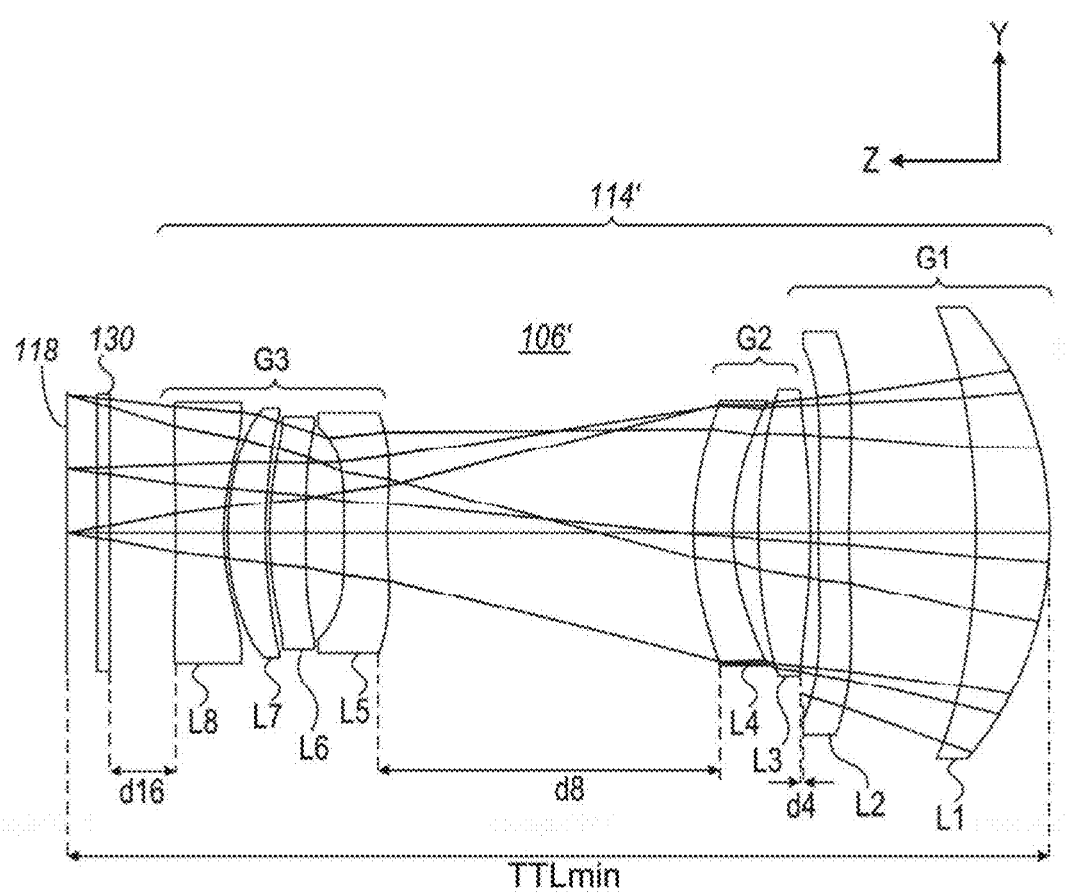
FIG. 2C shows details of the lens elements of the first optical design in the first zoom state.
Figure 2D:
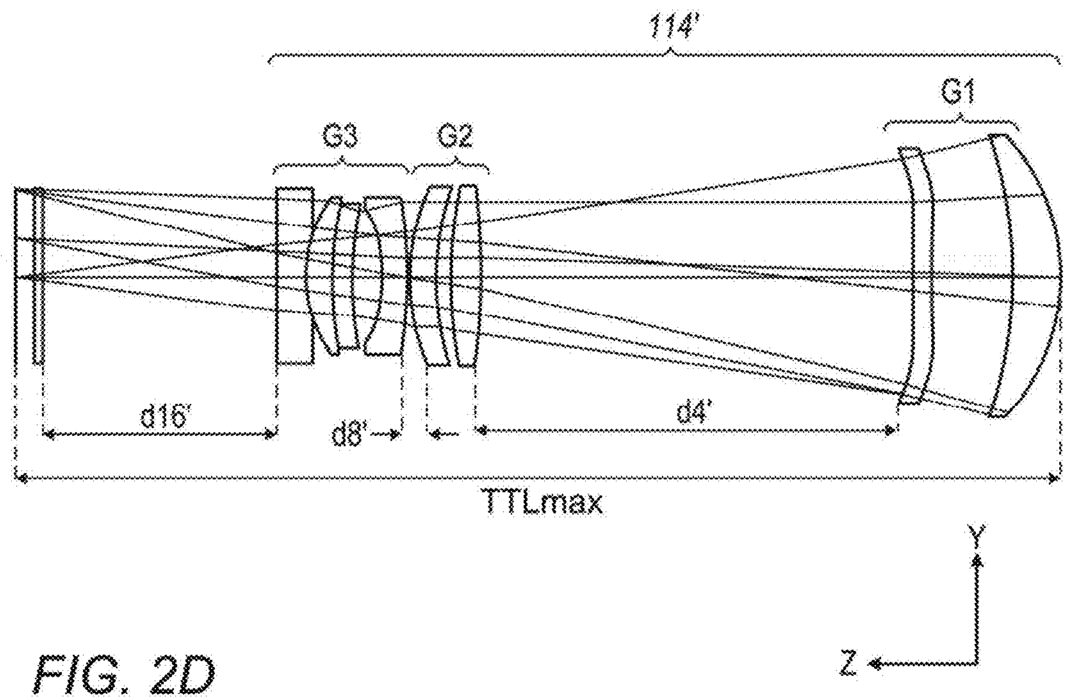
FIG. 2D shows details of the lens elements of the first optical design in the second zoom state.

FIG. 2A shows a zoom folded Tele camera 103' like camera 103 with OPFE 104 (e.g. prism), a lens 114' like lens 114, and image sensor 118 with a first exemplary optical design of a Tele lens 114' and with ray tracing, where the Tele lens is in a first zoom state, i.e. with $EFL=EFL_{Tmin}$. In addition, a glass window 130 may be positioned between all lens elements and image sensor 118. FIG. 2B shows folded Tele camera 103' in a second zoom state, i.e. with $EFL=EFL_{Tmax}$. FIG. 2C shows details of a lens 114' of the first optical design in the first zoom state, and FIG. 2D shows details of lens 114' in the second zoom state.

Lens 114' has a first exemplary optical design, represented by Tables 1-4 and includes eight lens elements marked L1-L8, starting with L1 on an object side facing the prism ("object side") and ending with L8 on an image side toward the image sensor. Table 1 provides optical data for each of the surfaces in the optical lens design. The optical data of the OPFE (prism or mirror) is omitted from Table 1, as many OPFE designs known in the art can be used between the object and $S_1$. Non-limiting examples of such OPFEs include: a prism made of glass or plastic, such that the refractive index of the prism may change (e.g. in a range of 1-3); an OPFE that limits stray light (e.g. as disclosed in co-owned international patent application PCT/IB2018/054928); a low profile prism (see e.g. co-owned U.S. provisional patent application 62/657,003); a scanning OPFE (see e.g. co-owned international patent applications PCT/IB2018/050885 and PCT/IB2017/); an OPFE with OIS mechanism (see e.g. co-owned U.S. Pat. No. 9,927,600); and a mirror.

Table 2 provides zoom data, which is additional data for distances between surfaces in Table 1, as well as changing parameters for various zoom positions. Table 3 provides aspheric data, which is additional optical data for surfaces in Table 1 that are not spherical. Table 4 provides lens elements and lens elements groups focal lengths in mm. Similar Tables exist for a second exemplary optical design (Tables 5-8), a third exemplary optical design (Tables 9-12) a fourth exemplary optical design (Tables 13-16) and a fifth exemplary optical design (Tables 17-20) below.

Lenses disclosed in various exemplary embodiments below comprise several lens groups (G1, G2, G3, etc.) of lens elements, each group including a plurality of lens elements marked Li. Each lens element Li has a respective front surface $S_{2i-1}$ and a respective rear surface $S_{2i}$ where "i" is an integer between 1 and N. As used herein, the term "front surface" of each lens element refers to the surface of a lens element located closer to the entrance of the camera (camera object side) and the term "rear surface" refers to the surface of a lens element located closer to the image sensor (camera image side). The front surface and/or the rear surface can be in some cases aspherical. The front surface and/or the rear surface can be in some cases spherical. These options are, however, not limiting. Lens elements L1 to LN may be made from various materials, for example plastic or glass. Some lens elements may be made of different materials than other lens elements. The notations "Gi", "Li", "$S_i$" are shown in several figures as an example (see FIGS. 2C, 2D for "Gi" notations, FIG. 2B for "Li" notations and FIG. 4A for "$S_i$" notations), however these notations apply for all embodiments in this application.

In this specification, "height" of a part, an element, or of a group of parts or elements is defined as a distance in the direction of the first optical axis (Y direction in an exemplary coordinate system) between the lowermost point of the part/element/group and the upper-most point of the part/element/group. The term "upper" or "top" refers to a section of any part/element/group that is closer to and facing an imaged (photographed) object along Y relative to other sections of the same part/element or group. The term "lower" or "bottom" refers to a section of any part/element/group that is farthest from and facing away from an imaged object along Y relative to other sections of the same part/element or group.

In Table 1 (as well as in Tables 5 and 9), R is the radius of curvature of a surface and T is the distance from the surface to the next surface parallel to an optical axis. Since the distance between some lens elements change with zooming and focusing, additional thickness data is given in Tables 2, 6 and 10 for various zoom and focus positions. Note that the $TTL_T$ is the sum of all T values starting from $S_1$ and to the image sensor, when additional data from Tables 2, 6 and is used with the object set at infinity. D is the optical diameter of the surface. D/2 expresses a "semi-diameter" or half of the diameter. The units of R, T, and D are millimeters (mm). Nd and Vd are the refraction index and Abbe number of the lens element material residing between the surface and the next surface, respectively.

Surface types are defined in Tables 1, 5 and 9 and the coefficients for the surfaces are in Tables 3, 7 and 11:

flat surfaces—has infinity radius of curvature;

Even-Aspherical (EVAS) surfaces, which are defined using Eq. 1 and their details given in Tables 3, 7 and 11:

$$EVAS = \frac{cr^2}{1+\sqrt{1-(1+k)c^2r^2}} + \alpha_2 r^4 + \alpha_3 r^6 \quad \text{(Eq. 1)}$$

where r is the distance of a point in the optical surface from (and perpendicular to) the relevant optical axis (first or second), k is the conic coefficient, c=1/R, and α are coefficients given in Tables 3, 7 and 11. Note that, for any aspheric surface, the maximum value of r ("max r") is the semi-diameter (D/2) of the respective surface.

QT1 surfaces are defined using Eq. 2 and sub-equations below:

$$QT1 = \frac{cr^2}{1+\sqrt{1-(1+k)c^2r^2}} + D_{con}(u) \quad \text{(Eq. 2)}$$

$$D_{con}(u) = u^4 \sum_{n=0}^{5} A_n Q_n^{con}(u^2)$$

$$u = \frac{r}{NR} \quad x = u^2$$

$$Q_0^{con}(x) = 1 \quad Q_1^{con} = -(5-6x) \quad Q_2^{con} = 15 - 14x(3-2x)$$

$$Q_3^{con} = -\{35 - 12x[14 - x(21-10x)]\}$$

$$Q_4^{con} = 70 - 3x\{168 - 5x[84 - 11x(8-3x)]\}$$

$$Q_5^{con} = -[126 - x(1260 - 11x\{420 - x[720 - 13x(45-14x)]\})]$$

where {z, r} are the standard cylindrical polar coordinates, c is the paraxial curvature of the surface, k is the conic parameter, NR is the norm radius, and $A_n$ are the polynomial coefficients shown in lens data tables.

A "stop surface" (Tables 2, 6, 10, 14, 18 and 22): in the embodiments disclosed, the position of a lens aperture stop surface may change when shifting from a first zoom state to a second zoom state. In this case, the stop determines the F # of the entire lens module. For example in some embodiments the amount of light reaching the image plane to form an image for center field in a first zoom state is determined by an aperture stop near the first lens from object side L1, whereas in a second zoom state the amount of light reaching the image plane to form an image for center field is determined by an aperture stop near another lens element, for example near lens element L4. In other embodiments, the position of a lens aperture stop surface may not change when shifting from a first zoom state to a second zoom state. The reflective surface of the prism, also commonly known as a "mirror".

The diameter D of the image sensor as presented in the tables below refers to a possible size of the image sensor diagonal.

TABLE 1

| Group | Lens | Surface | Type | R [mm] | T [mm] | Nd | Vd | D [mm] |
|---|---|---|---|---|---|---|---|---|
| Object | | $S_0$ | Flat | Infinity | See Table 2 | | | |
| G1 | L1 | $S_1$ | EVAS | 5.997 | 1.224 | 1.4847 | 84.150 | 7.50 |
| G1 | L1 | $S_2$ | EVAS | 13.606 | 2.104 | | | 7.50 |
| G1 | L2 | $S_3$ | EVAS | −19.106 | 0.509 | 1.8446 | 23.750 | 6.73 |
| G1 | L2 | $S_4$ | EVAS | −25.364 | See Table 2 | | | 6.24 |
| G2 | L3 | $S_5$ | EVAS | 11.959 | 0.864 | 1.5348 | 55.660 | 4.76 |
| G2 | L3 | $S_6$ | EVAS | −9.715 | 0.422 | | | 4.76 |
| G2 | L4 | $S_7$ | EVAS | −3.692 | 0.656 | 1.6510 | 21.510 | 4.40 |
| G2 | L4 | $S_8$ | EVAS | −4.784 | See Table 2 | | | 4.27 |
| G3 | L5 | $S_9$ | EVAS | −8.017 | 0.719 | 1.6510 | 21.510 | 4.00 |
| G3 | L5 | $S_{10}$ | EVAS | −1293.029 | 0.635 | | | 3.55 |
| G3 | L6 | $S_{11}$ | EVAS | −670.457 | 0.598 | 1.6510 | 21.510 | 3.59 |
| G3 | L6 | $S_{12}$ | EVAS | −7.424 | 0.073 | | | 3.88 |
| G3 | L7 | $S_{13}$ | EVAS | −7.140 | 0.624 | 1.6510 | 21.510 | 3.93 |
| G3 | L7 | $S_{14}$ | EVAS | −4.715 | 0.068 | | | 4.16 |
| G3 | L8 | $S_{15}$ | EVAS | −3.913 | 0.798 | 1.5348 | 55.660 | 4.22 |
| G3 | L8 | $S_{16}$ | EVAS | 45.594 | See Table 2 | | | 4.35 |
| Glass window | | $S_{17}$ | Flat | Infinity | 0.210 | 1.5168 | 64.170 | |
| | | $S_{18}$ | Flat | Infinity | 0.500 | | | |
| Image sensor | | $S_{19}$ | Flat | Infinity | 0 | | | |

TABLE 2

| | | First zoom state $EFL_T$ = 15 mm | | Second zoom state $EFL_T$ = 30 mm | |
|---|---|---|---|---|---|
| Object position | | at infinity | at 1 meter | at infinity | at 1 meter |
| Stop surface | | S8 | | S1 | |
| T [mm] | $S_0$ | Infinity | 1000 | Infinity | 1000 |
| | $S_4$ | 0.131 | 0.131 | 11.403 | 11.403 |
| | $S_8$ | 5.080 | 5.364 | 0.060 | 0.434 |
| | $S_{16}$ | 1.094 | 0.810 | 6.114 | 5.740 |

TABLE 3

| Surface | Conic (k) | $\alpha_2$ | $\alpha_3$ |
|---|---|---|---|
| $S_1$ | 0.512 | −2.110E−04 | −3.814E−06 |
| $S_2$ | 0.273 | 3.572E−04 | 1.917E−05 |
| $S_3$ | 20.233 | 5.134E−03 | −4.188E−05 |
| $S_4$ | 37.580 | 5.156E−03 | −2.918E−06 |
| $S_5$ | −17.980 | 3.967E−04 | −2.603E−04 |
| $S_6$ | 4.558 | 9.386E−04 | −2.360E−04 |
| $S_7$ | −0.178 | 7.713E−03 | −3.679E−04 |
| $S_8$ | 0.700 | 5.789E−03 | −1.981E−04 |
| $S_9$ | −37.208 | 2.833E−02 | −2.126E−03 |
| $S_{10}$ | −2.729 | 3.813E−02 | 1.651E−03 |
| $S_{11}$ | −9.193 | −2.622E−02 | 4.029E−03 |
| $S_{12}$ | −5.072 | −1.207E−02 | 3.646E−03 |
| $S_{13}$ | 9.708 | 1.232E−02 | −6.426E−04 |
| $S_{14}$ | 3.593 | 2.145E−03 | 4.976E−04 |
| $S_{15}$ | 1.298 | 1.152E−02 | 2.260E−03 |
| $S_{16}$ | −8.975 | −1.222E−03 | −1.182E−04 |

TABLE 4

| Lens # | Lens or group focal length [mm] |
|---|---|
| L1 | 14.88 |
| L2 | −28.15 |
| L3 | 12.85 |
| L4 | −49.00 |
| L5 | 65.32 |
| L6 | −9.17 |
| L7 | −32.37 |
| L8 | 19.45 |
| G1 | 23.01 |
| G2 | 15.28 |
| G3 | −11.55 |

In a first example ("Example 1"), lens elements L1-L8 are grouped into three groups: a first group G1 comprising lens elements L1 and L2, a second group G2 comprising lens elements L3 and L4 and a third group comprising lens elements L5-L8. Note that the lens or group focal lengths listed in Table 4 have positive or negative values, which indicate respective positive or negative refractive powers of the associates lens elements or groups. Thus, in Table 4, L1, L3, L5 and L8 have positive refractive powers and L2, L4, L6 and L7 have negative refractive powers Similarly, G1 and G2 have positive refractive powers and G3 has negative refractive power. This applies also to Tables 8 and 12.

In Example 1, the camera is brought into two zoom states by moving groups G1 and G3 relative to image sensor 118 while keeping group G2 stationary relative to image sensor 118. G3 is then further movable for focusing in each of the zoom states. Table 2 specifies the exact distances and relative positioning. In Example 1, G1 and G3 are moved relatively to G2 (and the image sensor) to bring the camera into a first zoom state shown in FIGS. 2A and 2C in which $EFL_T=EFL_{Tmin}=15$ mm, F #=F $\#_{Tmin}=2.8$ and $TTL_T=TTL_{Tmin}=16.309$ mm, and into a second zoom state shown in FIGS. 2B and 2D in which $EFL_T=EFL_{Tmax}=30$ mm, F #=F $\#_{Tmax}=4$ and $TTL_T=TTL_{Tmin}=27.581$ mm. The range of movement may be for example 5-10 mm. In the first state, G1 is separated from G2 by a distance d4 (the distance between $S_4$ and $S_5$ in Table 2 fora case of 15 mm EFL, i.e. 0.131 mm), G2 is separated from G3 by a distance d8 (the distance between $S_8$ and $S_9$ in Table 2 for a case of 15 mm EFL, i.e. 5.080-5.364 mm, depending on the focus distance) and G3 is separated from window 130 by a distance d16 (the distance between $S_{16}$ and $S_{17}$ in Table 2 for a case of 15 mm EFL, i.e. 1.094 to 0.810 mm, depending on the focus distance). In the second state, G1 is separated from G2 by a distance d4' (the distance between $S_4$ and $S_5$ in Table 2 for a case of 30 mm EFL, i.e. 11.403 mm), G2 is separated from G3 by a distance d8' (the distance between $S_8$ and $S_9$ in Table 2 fora case of 30 mm EFL, i.e. 0.060-0.434 mm, depending on the focus distance) and G3 is separated from window 130 by a distance d16' (the distance between $S_{16}$ and $S_{17}$ in Table 2 for a case of 30 mm EFL, i.e. 6.114 mm to 5.740 mm depending on the focus distance).

Figures 3A, 3B:
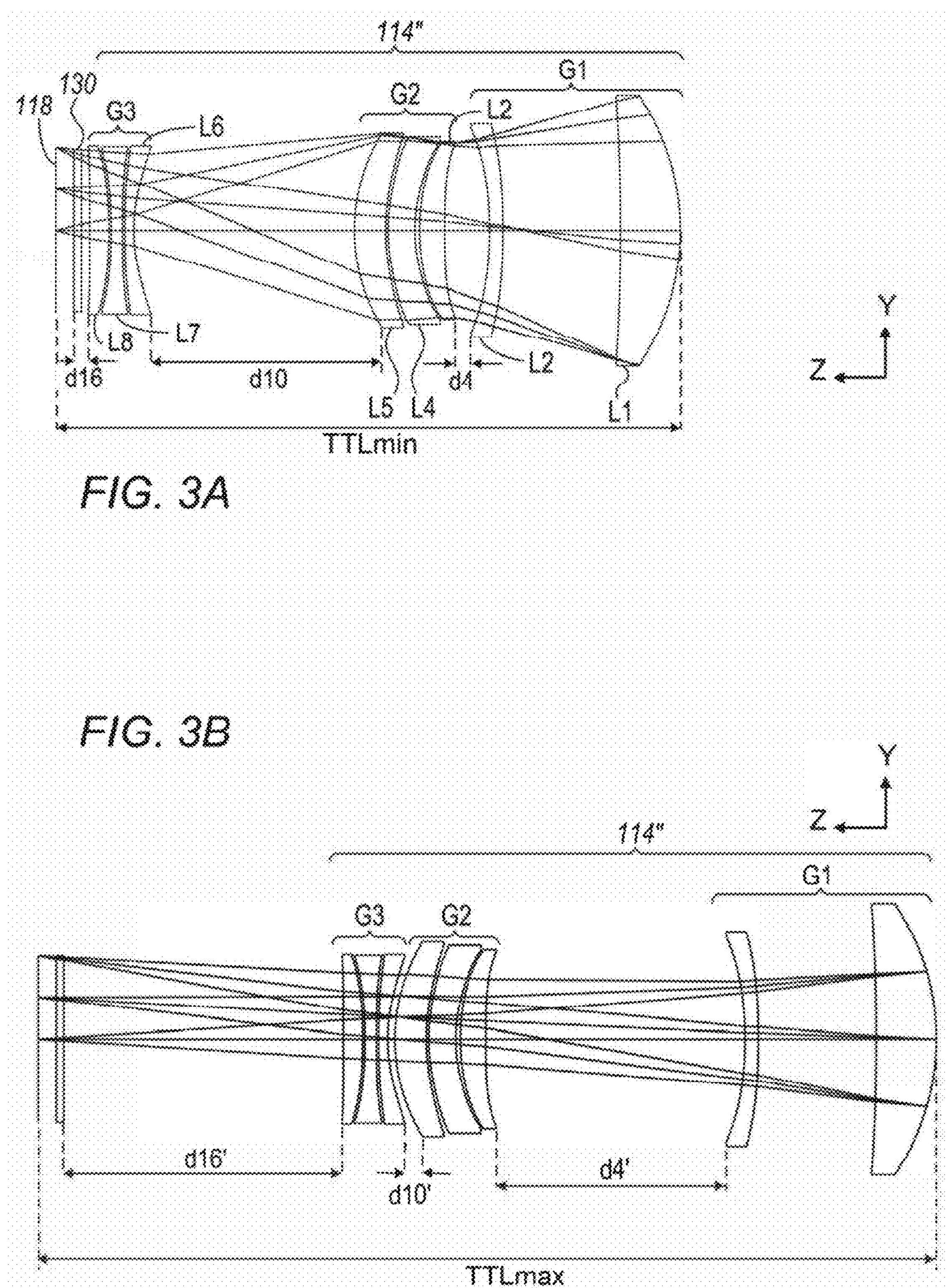
FIG. 3A shows details of the lens elements of a second optical design in a first zoom state.
FIG. 3B shows details of the lens elements of the second optical design in a second zoom state.

FIG. 3A shows details of the lens elements of a second embodiment of an exemplary optical design in a folded Tele camera such as camera 103 in a first zoom state, while FIG. 3B shows details of the lens elements of the second optical design in a second zoom state. The figures show a lens 114", image sensor 118 and optional window 130. The second optical design is represented by Tables 5-8 and includes eight lens elements marked L1-L8, starting with L1 on an object side facing the prism and ending with L8 on an image side toward the image sensor. Table 5 provides optical data, Table 6 provides zoom data, Table 7 provides aspheric data and Table 8 provides lens or group focal length in mm.

In a second example ("Example 2"), in lens 114", lens elements L1-L8 are grouped into three groups: a first group G1 comprising lens elements L1 and L2, a second group G2 comprising lens elements L3-L5, and a third group comprising lens elements L6-L8.

In Example 2, the camera is brought into two zoom states by moving groups G1 and G3 together relative to the image sensor in a given range $R_{1,3}$ while moving group G2 relative to the image sensor in a range $R_2$ smaller than $R_{1,3}$. In Example 2, $R_{1,3}=7.509$ mm, while $R_2=1.574$ mm. Group G2 is further movable at any zoom state relative to the image sensor in a range $R_{AF}$ for changing the focal distance of camera 106 from infinity down to 1 meter. $R_{AF}$ may be up to 550 micrometers (um), depending on zoom state. FIG. 3A shows Example 2 in the first zoom state in which $EFL_T=EFL_{Tmin}=15$ mm, F #=F $\#_{Tmin}=2$ and $TTL_T=TTL_{Tmin}=17.373$ mm, and FIG. 3B shows Example 2 in the second zoom state in which $EFL_T=EFL_{Tmax}=30$ mm, F #=F $\#_{Tmax}=4$, and $TTL_T=TTL_{Tmax}=24.881$ mm.

In Example 2, the following conditions are fulfilled:

$R_{1,3}$ and $R_2$ are smaller than $0.6\times(EFL_{Tmax}-EFL_{Tmin})$ and of course smaller than $0.75\times(EFL_{Tmax}-EFL_{Tmin})$. F $\#_{Tmin}$ is smaller than $1.0\times$F $\#_{Tmax}\times EFL_{Tmin}/EFL_{Tmax}$, smaller than $1.2\times$F $\#_{Tmax}\times EFL_{Tmin}/EFL_{Tmax}$, smaller than $1.5\times$F $\#_{Tmax}\times EFL_{Tmin}/EFL_{Tmax}$ and smaller than $1.8\times$F $\#_{Tmax}\times EFL_{Tmin}/EFL_{Tmax}$.

In the first state, G1 is separated from G2 by a distance d4 (the distance between $S_4$ and $S_5$ in Table 6 for a case of 15 mm EFL, i.e. 1.246 to 1.012 mm, depending on the focus distance), G2 is separated from G3 by a distance d10 (the distance between $S_{10}$ and $S_{11}$ in Table 6 for a case of 15 mm EFL, i.e. 6.136-6.370 mm, depending on the focus distance) and G3 is separated from window 130 by a distance d16 (the distance between $S_{16}$ and $S_{17}$ in Table 6 for a case of 15 mm EFL, i.e. 0.229 mm,). In the second state, G1 is separated from G2 by a distance d4' (the distance between $S_4$ and $S_5$ in Table 6 for a case of 30 mm EFL, i.e. 7.181 to 6.658 mm, depending on the focus distance), G2 is separated from G3 by a distance d10' (the distance between $S_{10}$ and $S_{11}$ in Table 6 for a case of 30 mm EFL, i.e. 0.2 to 0.725 mm, depending on the focus distance) and G3 is separated from window 130 by a distance d16' (the distance between $S_{16}$ and $S_{17}$ in Table 6 for a case of 30 mm EFL, i.e. 7.738 mm).

TABLE 5

| Group | Lens | Surface | Type | R [mm] | T [mm] | Nd | Vd | D [mm] |
|---|---|---|---|---|---|---|---|---|
| Object | | $S_0$ | Flat | Infinity | See Table 6 | | | |
| G1 | L1 | $S_1$ | QT1 | 6.615 | 1.666 | 1.4847 | 84.150 | 7.50 |
| G1 | L1 | $S_2$ | QT1 | 71.898 | 3.268 | | | 7.30 |
| G1 | L2 | $S_3$ | QT1 | 21.616 | 0.373 | 1.8446 | 23.750 | 5.87 |
| G1 | L2 | $S_4$ | QT1 | 10.973 | See Table 6 | | | 5.62 |
| G2 | L3 | $S_5$ | QT1 | −37.902 | 0.700 | 1.5348 | 55.660 | 4.86 |
| G2 | L3 | $S_6$ | QT1 | −5.871 | 0.132 | | | 4.95 |
| G2 | L4 | $S_7$ | QT1 | −3.976 | 0.744 | 1.6510 | 21.510 | 4.93 |
| G2 | L4 | $S_8$ | QT1 | −4.874 | 0.067 | | | 5.20 |
| G2 | L5 | $S_9$ | QT1 | −5.651 | 0.869 | 1.5348 | 55.660 | 5.38 |
| G2 | L5 | $S_{10}$ | QT1 | −5.128 | See Table 6 | | | 5.38 |
| G3 | L6 | $S_{11}$ | QT1 | −4.749 | 0.250 | 1.5348 | 55.660 | 4.77 |
| G3 | L6 | $S_{12}$ | QT1 | −139.803 | 0.063 | | | 4.74 |
| G3 | L7 | $S_{13}$ | QT1 | −444.631 | 0.318 | 1.5348 | 55.660 | 4.73 |
| G3 | L7 | $S_{14}$ | QT1 | 18.077 | 0.060 | | | 4.75 |
| G3 | L8 | $S_{15}$ | QT1 | 15.930 | 0.542 | 1.6510 | 21.510 | 4.78 |
| G3 | L8 | $S_{16}$ | QT1 | −63.413 | See Table 6 | | | 4.77 |
| Glass window | | $S_{17}$ | Flat | Infinity | 0.210 | 1.5168 | 64.170 | |
| | | $S_{18}$ | Flat | Infinity | 0.500 | | | |
| Image sensor | | $S_{19}$ | Flat | Infinity | 0 | | | |

TABLE 6

| | | First zoom state $EFL_T$ = 15 mm | | Second zoom state $EFL_T$ = 30 mm | |
|---|---|---|---|---|---|
| Object position | | at infinity | at 1 meter | at infinity | at 1 meter |
| Stop surface | | S5 | | S1 | |
| T [mm] | $S_0$ | Infinity | 1000 | Infinity | 1000 |
| | $S_4$ | 1.246 | 1.012 | 7.181 | 6.658 |
| | $S_{10}$ | 6.136 | 6.370 | 0.200 | 0.725 |
| | $S_{16}$ | 0.229 | 0.229 | 7.738 | 7.738 |

TABLE 7

| Surface | Conic | NR | $A_0$ | $A_1$ | $A_2$ | $A_3$ | $A_4$ | $A_5$ |
|---|---|---|---|---|---|---|---|---|
| $S_1$ | 0 | 3.7 | −1.071E−02 | −7.810E−04 | 7.874E−05 | −9.666E−05 | 3.754E−06 | 2.463E−06 |
| $S_2$ | 0 | 3.7 | 3.115E−02 | −1.285E−03 | 1.465E−04 | −2.067E−04 | 4.660E−05 | −9.353E−07 |
| $S_3$ | 0 | 3.7 | 2.719E−01 | −4.051E−02 | 2.860E−03 | 5.289E−04 | 7.861E−04 | −8.761E−04 |
| $S_4$ | 0 | 3.7 | 3.639E−01 | −3.214E−02 | 6.330E−03 | 2.656E−03 | 9.124E−04 | −1.171E−03 |
| $S_5$ | 0 | 3.7 | −1.507E+00 | −1.910E−01 | −6.434E−02 | −1.200E−02 | 5.825E−04 | −5.555E−04 |
| $S_6$ | 0 | 3.7 | −8.373E−01 | −1.648E−01 | −4.615E−04 | −1.051E−02 | 2.529E−03 | 2.881E−03 |
| $S_7$ | 0 | 3.7 | 5.590E−01 | 1.990E−02 | 1.374E−01 | 8.401E−03 | 6.293E−03 | 6.466E−03 |
| $S_8$ | 0 | 3.7 | 4.388E−01 | −1.366E−01 | 5.125E−02 | −1.241E−02 | −2.885E−03 | 8.741E−04 |
| $S_9$ | 0 | 3.7 | 5.075E−01 | −1.496E−02 | 6.068E−02 | 1.246E−02 | −8.803E−04 | −4.615E−03 |
| $S_{10}$ | 0 | 3.7 | −8.004E−02 | −5.974E−02 | −2.987E−02 | −2.815E−03 | 7.390E−04 | −1.480E−03 |
| $S_{11}$ | 0 | 3.7 | 8.519E−01 | −5.488E−02 | −5.544E−02 | −7.854E−03 | 3.268E−03 | 6.359E−03 |
| $S_{12}$ | 0 | 3.7 | −1.077E−01 | 2.667E−01 | −4.035E−02 | −5.846E−03 | −2.225E−02 | 2.213E−03 |
| $S_{13}$ | 0 | 3.7 | −9.512E−01 | 3.384E−02 | 4.268E−02 | 5.478E−02 | −3.769E−03 | −2.779E−03 |
| $S_{14}$ | 0 | 3.7 | 1.676E−01 | −2.814E−01 | 2.307E−02 | 1.180E−02 | −3.634E−03 | −1.653E−02 |
| $S_{15}$ | 0 | 3.7 | 8.046E−01 | 6.039E−02 | 9.548E−02 | 1.891E−02 | 8.015E−03 | −7.180E−03 |
| $S_{16}$ | 0 | 3.7 | 3.581E−01 | −4.279E−02 | 1.900E−02 | 9.315E−03 | 1.405E−02 | 4.839E−03 |

TABLE 8

| Lens # | Lens or group focal length [mm] |
|---|---|
| L1 | 14.88 |
| L2 | −28.15 |
| L3 | 12.85 |
| L4 | −49.00 |
| L5 | 65.32 |

TABLE 8-continued

| Lens # | Lens or group focal length [mm] |
|---|---|
| L6 | −9.17 |
| L7 | −32.37 |
| L8 | 19.45 |
| G1 | 23.01 |
| G2 | 15.28 |
| G3 | −11.55 |

Figures 4A, 4B:
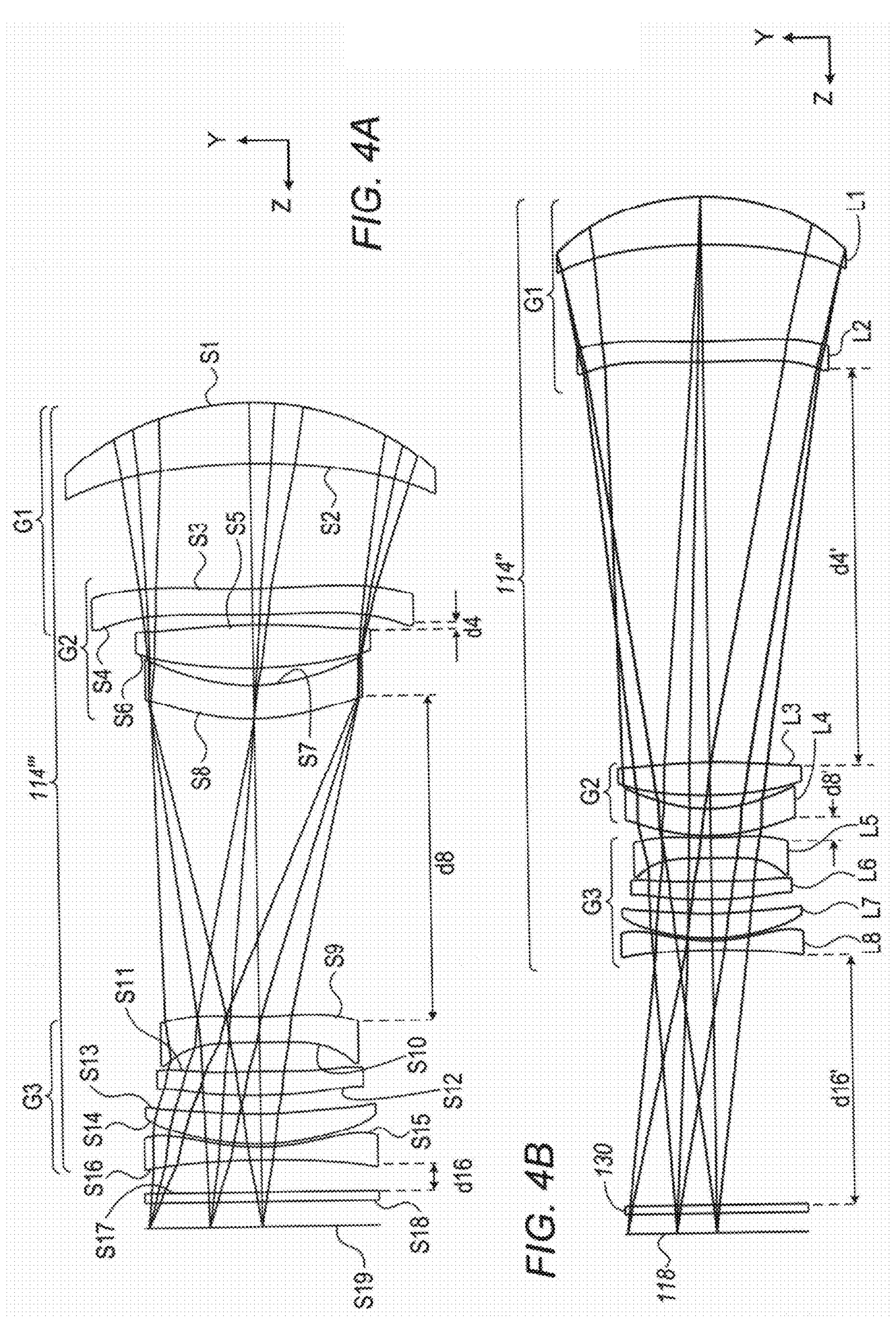
FIG. 4A shows details of the lens elements of a third optical design in a first zoom state.
FIG. 4B shows details of the lens elements of the third optical design in a second zoom state.

FIG. 4A shows details of the lens elements of a third embodiment of an exemplary optical design in a folded Tele camera such as camera 103 in a first zoom state, while FIG. 4B shows details of the lens elements of the third optical design in a second zoom state. The figures show a lens 114''', image sensor 118 and optional window 130. The third optical design is represented by Tables 9-12 and includes eight lens elements marked L1-L8, starting with L1 on an object side facing the prism and ending with L8 on an image side toward the image sensor. Table 9 provides optical data, Table 10 provides zoom data, Table 11 provides aspheric data and Table 12 provides lens or group focal length in mm.

In lens 114''', lens elements L1-L8 are grouped into three groups: a first group G1 comprising lens elements L1 and L2, a second group G2 comprising lens elements L3 and L4, and a third group comprising lens elements L5-L8.

In a third exemplary use ("Example 3"), the camera is brought into two zoom states by moving groups G1 and G3 relative to the image sensor in a given range while keeping group G2 stationary. The range of movement may be for example 5-10 mm. G1 is further movable for focusing. In Example 3, Gi and G3 are moved relatively to G2 (and the image sensor) to bring the camera into a first zoom state shown in FIG. 4A in which $EFL_T$=$EFL_{Tmin}$=15 mm, F $\#_{Tmin}$=2.74 and $TTL_T$=$TTL_{Tmin}$=16.78 mm, and into a second zoom state shown in FIG. 4B in which $EFL_T$=$EFL_{Tmax}$=30 mm, F #=F $\#_{Tmax}$=4 and $TTL_T$=$TTL_{Tmax}$=26.958 mm. In the first state, G1 is separated from G2 by a distance d4 (the distance between $S_4$ and $S_5$ in Table 10 for a case of 15 mm EFL, i.e. 0.199-0.870 mm, depending on the focus distance), G2 is separated from G3 by a distance d8 (the distance between $S_8$ and $S_9$ in Table 10 for a case of 15 mm EFL, i.e. 6.050 mm) and G3 is separated from window 130 by a distance d16 (the distance between $S_{16}$ and $S_{17}$ in Table 10 for a case of 15 mm EFL, i.e. 0.650 mm). In the second state, G1 is separated from G2 by a distance d4 (the distance between $S_4$ and $S_5$ in Table 10 for a case of 30 mm EFL, i.e. 10.377-11.031 mm, depending on the focus distance), G2 is separated from G3 by a distance d8 (the distance between $S_8$ and $S_9$ in Table 10 for a case of 30 mm EFL, i.e. 0.06 mm,) and G3 is separated from window 130 by a distance d16 (the distance between $S_{16}$ and $S_{17}$ in Table 10 for a case of 30 mm EFL, i.e. 6.64 mm).

TABLE 9

| Group | Lens | Surface | Type | R [mm] | T [mm] | Nd | Vd | D [mm] |
|---|---|---|---|---|---|---|---|---|
| Object | | $S_0$ | Flat | Infinity | See Table 10 | | | |
| G1 | L1 | $S_1$ | EVAS | 5.965 | 1.246 | 1.4847 | 84.150 | 7.50 |
| G1 | L1 | $S_2$ | EVAS | 14.446 | 2.524 | | | 7.50 |
| G1 | L2 | $S_3$ | EVAS | −18.902 | 0.545 | 1.8446 | 23.750 | 6.52 |
| G1 | L2 | $S_4$ | EVAS | −27.153 | See Table 10 | | | 6.24 |
| G2 | L3 | $S_5$ | EVAS | 15.497 | 0.881 | 1.5348 | 55.660 | 4.76 |
| G2 | L3 | $S_6$ | EVAS | −9.815 | 0.351 | | | 4.76 |
| G2 | L4 | $S_7$ | EVAS | −3.714 | 0.694 | 1.6510 | 21.510 | 4.40 |
| G2 | L4 | $S_8$ | EVAS | −4.750 | See Table 10 | | | 4.27 |
| G3 | L5 | $S_9$ | EVAS | −8.318 | 0.535 | 1.6510 | 21.510 | 4.00 |
| G3 | L5 | $S_{10}$ | EVAS | −49.289 | 0.581 | | | 3.84 |
| G3 | L6 | $S_{11}$ | EVAS | 29.648 | 0.492 | 1.6510 | 21.510 | 4.01 |
| G3 | L6 | $S_{12}$ | EVAS | −15.803 | 0.371 | | | 4.17 |
| G3 | L7 | $S_{13}$ | EVAS | −8.902 | 0.625 | 1.6510 | 21.510 | 4.51 |
| G3 | L7 | $S_{14}$ | EVAS | −5.204 | 0.066 | | | 4.66 |
| G3 | L8 | $S_{15}$ | EVAS | −4.708 | 0.260 | 1.5348 | 55.660 | 4.73 |
| G3 | L8 | $S_{16}$ | EVAS | 21.740 | See Table 10 | | | 4.65 |
| Glass window | | $S_{17}$ | Flat | Infinity | 0.210 | 1.5168 | 64.170 | |
| | | $S_{18}$ | Flat | Infinity | 0.500 | | | |
| Image sensor | | $S_{19}$ | Flat | Infinity | 0 | | | |

TABLE 10

| | | First zoom state $EFL_T$ = 15 mm | | Second zoom state $EFL_T$ = 30 mm | |
|---|---|---|---|---|---|
| Object position | | at infinity | at 1 meter | at infinity | at 1 meter |
| Stop surface | | S8 | | S1 | |
| T [mm] | $S_0$ | Infinity | 1000 | Infinity | 1000 |
| | $S_4$ | 0.199 | 0.870 | 10.377 | 11.031 |
| | $S_8$ | 6.050 | 6.050 | 0.060 | 0.060 |
| | $S_{16}$ | 0.650 | 0.650 | 6.640 | 6.640 |

TABLE 11

| Surface | Conic (k) | $\alpha_2$ | $\alpha_3$ |
|---|---|---|---|
| $S_1$ | 0.522 | −1.7367E−04 | 1.4347E−06 |
| $S_2$ | 1.931 | 4.4699E−04 | 2.3992E−05 |
| $S_3$ | 19.446 | 5.1529E−03 | −5.1705E−05 |
| $S_4$ | 42.199 | 5.0933E−03 | −1.1038E−05 |
| $S_5$ | −19.929 | −9.0502E−05 | −2.5378E−04 |
| $S_6$ | 5.537 | 1.3905E−03 | −2.6043E−04 |
| $S_7$ | −0.207 | 7.6849E−03 | −3.0619E−04 |
| $S_8$ | 0.535 | 5.5481E−03 | −1.4016E−04 |
| $S_9$ | −36.500 | 2.6433E−02 | −1.9343E−03 |
| $S_{10}$ | 10.019 | 3.3334E−02 | 5.6299E−04 |
| $S_{11}$ | −10.151 | −2.4156E−02 | 4.1713E−03 |
| $S_{12}$ | 10.679 | −1.3708E−02 | 3.1066E−03 |
| $S_{13}$ | 10.006 | 1.3443E−02 | −1.0812E−03 |
| $S_{14}$ | 3.232 | 5.2907E−03 | 7.9836E−05 |
| $S_{15}$ | 1.099 | 6.4779E−03 | 1.6274E−03 |
| $S_{16}$ | 3.669 | 8.5666E−04 | 8.2964E−05 |

TABLE 12

| Lens # | Lens or group focal length [mm] |
|---|---|
| L1 | 19.95 |
| L2 | −75.22 |
| L3 | 11.33 |
| L4 | −35.23 |
| L5 | −15.29 |
| L6 | 15.73 |
| L7 | 17.84 |
| L8 | −7.18 |
| G1 | 25.67 |
| G2 | 17.78 |
| G3 | −11.14 |

Figure 4C:
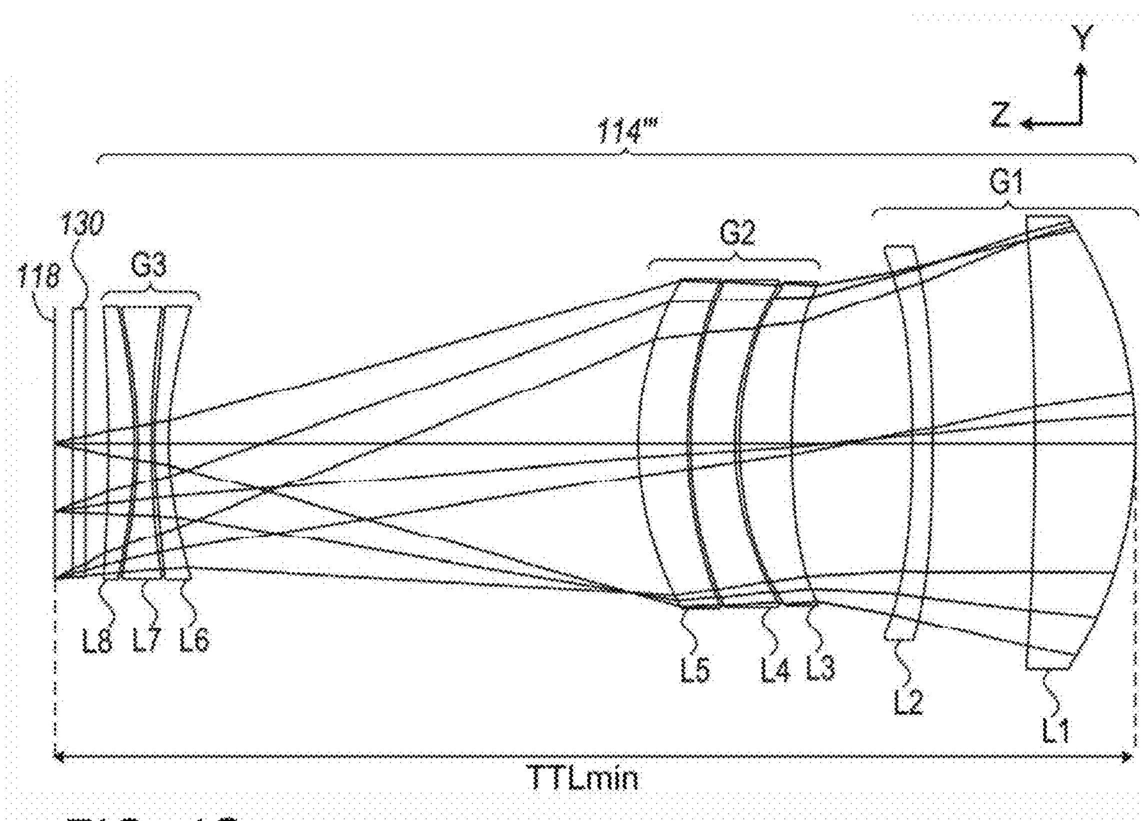
FIG. 4C shows details of the lens elements of a fourth optical design in a first zoom state.
Figure 4D:
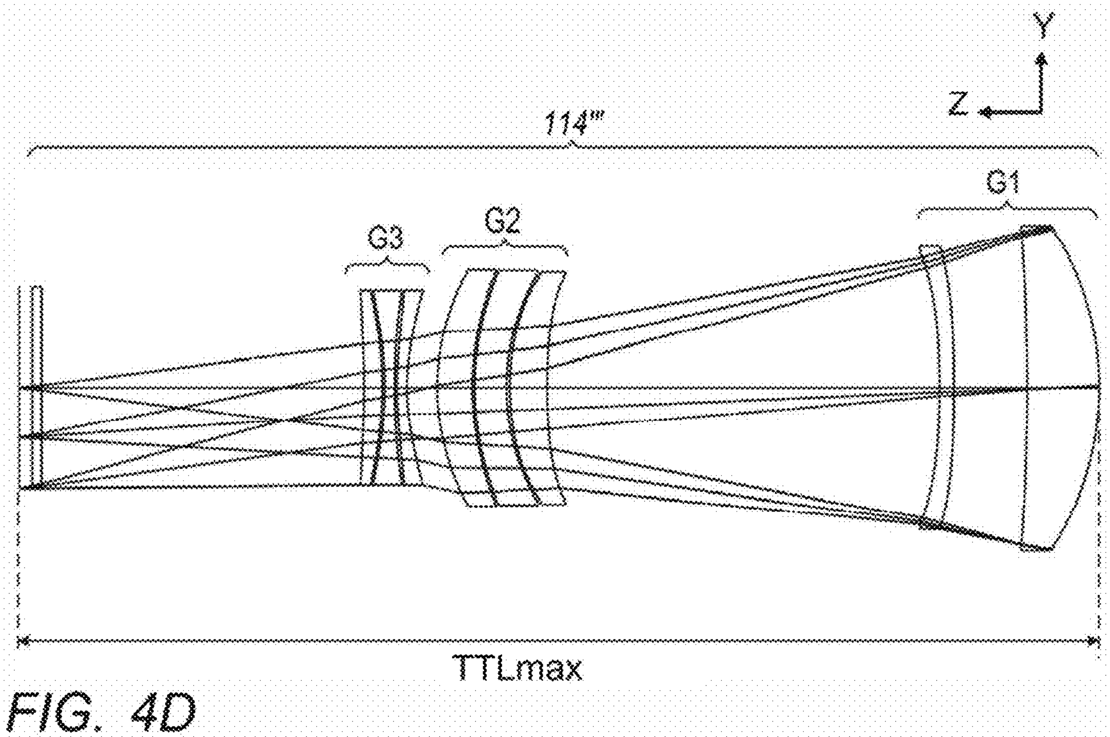
FIG. 4D shows details of the lens elements of the fourth optical design in a second zoom state.

FIG. 4C shows details of the lens elements of a fourth exemplary optical design in a folded Tele camera such as camera 103 in a first zoom state, while FIG. 4D shows details of the lens elements of the fourth optical design in a second zoom state. The figures show a lens 114"", image sensor 118 and optional window 130. The fourth optical design is represented by Tables 13-16 and includes eight lens elements marked L1-L8, starting with L1 on an object side facing the prism and ending with L8 on an image side toward the image sensor. Table 13 provides optical data, Table 14 provides zoom data, Table 15 provides aspheric data and Table 16 provides lens or group focal length in mm.

In a fourth example ("Example 4"), in lens 114"", lens elements L1-L8 are grouped into three groups: a first group G1 comprising lens elements L1 and L2, a second group G2 comprising lens elements L3-L5, and a third group comprising lens elements L6-L8.

In Example 4, the camera is brought into two zoom states by moving groups G1 and G3 together (as one unit) relative to the image sensor in a given range $R_{1,3}$ while group G2 is stationary relative to the image sensor in the zoom process. In Example 5, $R_{1,3}$=7.065 mm. While group G2 does not move when changing zoom state, group G2 is movable at any zoom state relative to the image sensor and groups G1 and G3 in a range $R_{AF}$ for changing the focal distance of camera 106 from infinity down to 1 meter. $R_{AF}$ may be up to 730 μm, depending on zoom state. FIG. 4C shows Example 4 in the first zoom state in which $EFL_T$=$EFL_{Tmin}$=15 mm, F #=F $\#_{Tmin}$=2 and $TTL_T$=$TTL_{Tmin}$=17.865 mm, and FIG. 4D shows Example 4 in the second zoom state in which $EFL_T$=$EFL_{Tmax}$=30 mm, F #=F $\#_{Tmax}$=4, and $TTL_T$=$TTL_{Tmax}$=24.93 mm.

In the first state, G1 is separated from G2 by a distance d4 (the distance between $S_4$ and $S_5$ in Table 14 for a case of 15 mm EFL, G2 is separated from G3 by a distance d10 (the distance between $S_{10}$ and $S_{11}$ in Table 14 for a case of 15 mm EFL, and G3 is separated from window 130 by a distance d16 (the distance between $S_1$ and $S_{17}$ in Table 14 for a case of 15 mm EFL. In the second state, G1 is separated from G2 by a distance d4' (the distance between $S_4$ and $S_5$ in Table 14 for a case of 30 mm EFL), G2 is separated from G3 by a distance d10' (the distance between $S_{10}$ and $S_{11}$ in Table 14 for a case of 30 mm EFL) and G3 is separated from window 130 by a distance d16' (the distance between $S_{16}$ and $S_{17}$ in Table 14 for a case of 30 mm EFL).

TABLE 13

| Group | Lens | Surface | Type | R [mm] | T [mm] | Nd | Vd | D [mm] |
|---|---|---|---|---|---|---|---|---|
| Object | | $S_0$ | Flat | Infinity | See Table 14 | | | |

TABLE 13-continued

| Group | Lens | Surface | Type | R [mm] | T [mm] | Nd | Vd | D [mm] |
|---|---|---|---|---|---|---|---|---|
| G1 | L1 | $S_1$ | QT1 | 6.795 | 1.665 | 1.4847 | 84.150 | 7.50 |
| G1 | L1 | $S_2$ | QT1 | 55.652 | 1.690 | | | 7.28 |
| G1 | L2 | $S_3$ | QT1 | 38.079 | 0.330 | 1.7978 | 22.463 | 6.53 |
| G1 | L2 | $S_4$ | QT1 | 18.832 | See Table 14 | | | 6.32 |
| G2 | L3 | $S_5$ | QT1 | −14.657 | 0.862 | 1.5348 | 55.660 | 5.43 |
| G2 | L3 | $S_6$ | QT1 | −5.687 | 0.076 | | | 5.50 |
| G2 | L4 | $S_7$ | QT1 | −5.011 | 0.735 | 1.6510 | 21.510 | 5.41 |
| G2 | L4 | $S_8$ | QT1 | −6.654 | 0.052 | | | 5.50 |
| G2 | L5 | $S_9$ | QT1 | −6.344 | 0.813 | 1.5348 | 55.660 | 5.47 |
| G2 | L5 | $S_{10}$ | QT1 | −5.302 | See Table 14 | | | 5.51 |
| G3 | L6 | $S_{11}$ | QT1 | −4.891 | 0.230 | 1.5348 | 55.660 | 4.54 |
| G3 | L6 | $S_{12}$ | QT1 | −7.762 | 0.050 | | | 4.54 |
| G3 | L7 | $S_{13}$ | QT1 | −17.929 | 0.230 | 1.5348 | 55.660 | 4.53 |
| G3 | L7 | $S_{14}$ | QT1 | 7.959 | 0.057 | | | 4.60 |
| G3 | L8 | $S_{15}$ | QT1 | 8.309 | 0.425 | 1.6510 | 21.510 | 4.63 |
| G3 | L8 | $S_{16}$ | QT1 | 21.747 | See Table 14 | | | 4.65 |
| Glass window | | $S_{17}$ | Flat | Infinity | 0.210 | 1.5168 | 64.170 | |
| | | $S_{18}$ | Flat | Infinity | 0.300 | | | |
| Image sensor | | $S_{19}$ | Flat | Infinity | 0 | | | |

TABLE 14

| | | First zoom state $EFL_T$ = 15 mm | | Second zoom state $EFL_T$ = 30 mm | |
|---|---|---|---|---|---|
| Object position | | at infinity | at 1 meter | at infinity | at 1 meter |
| Stop surface | | S1 | | S1 | |
| T [mm] | $S_0$ | Infinity | 1000 | Infinity | 1000 |
| | $S_4$ | 1.996 | 1.717 | 9.060 | 8.337 |
| | $S_{10}$ | 7.764 | 8.043 | 0.700 | 1.423 |
| | $S_{16}$ | 0.380 | 0.380 | 7.445 | 7.445 |

TABLE 15

| Surface | Conic | NR | $A_0$ | $A_1$ | $A_2$ | $A_3$ | $A_4$ | $A_5$ |
|---|---|---|---|---|---|---|---|---|
| $S_1$ | 0 | 3.7 | −1.185E−02 | −4.312E−04 | −7.102E−05 | 0.000E+00 | 0.000E+00 | 0.000E+00 |
| $S_2$ | 0 | 3.7 | 1.691E−02 | 4.449E−04 | −2.627E−04 | 0.000E+00 | 0.000E+00 | 0.000E+00 |
| $S_3$ | 0 | 3.7 | 2.920E−01 | −1.206E−02 | −1.439E−03 | 0.000E+00 | 0.000E+00 | 0.000E+00 |
| $S_4$ | 0 | 3.7 | 3.521E−01 | −7.983E−03 | −1.529E−03 | 0.000E+00 | 0.000E+00 | 0.000E+00 |
| $S_5$ | 0 | 3.7 | −9.944E−01 | −1.351E−01 | −1.582E−02 | 0.000E+00 | 0.000E+00 | 0.000E+00 |
| $S_6$ | 0 | 3.7 | −3.506E−01 | −8.796E−03 | 3.480E−02 | 0.000E+00 | 0.000E+00 | 0.000E+00 |
| $S_7$ | 0 | 3.7 | 2.435E−01 | 7.231E−02 | 3.347E−02 | 0.000E+00 | 0.000E+00 | 0.000E+00 |
| $S_8$ | 0 | 3.7 | 7.927E−02 | 9.735E−03 | 2.347E−04 | 0.000E+00 | 0.000E+00 | 0.000E+00 |
| $S_9$ | 0 | 3.7 | 1.102E−01 | −4.921E−02 | 3.957E−03 | 0.000E+00 | 0.000E+00 | 0.000E+00 |
| $S_{10}$ | 0 | 3.7 | 3.430E−02 | −4.824E−02 | 1.267E−04 | 0.000E+00 | 0.000E+00 | 0.000E+00 |
| $S_{11}$ | 0 | 3.7 | 9.549E−01 | 3.565E−02 | 1.185E−01 | 0.000E+00 | 0.000E+00 | 0.000E+00 |
| $S_{12}$ | 0 | 3.7 | 7.134E−01 | −4.530E−02 | 1.012E−01 | 0.000E+00 | 0.000E+00 | 0.000E+00 |
| $S_{13}$ | 0 | 3.7 | 6.795E−02 | 1.289E−01 | 2.055E−02 | 0.000E+00 | 0.000E+00 | 0.000E+00 |
| $S_{14}$ | 0 | 3.7 | 4.103E−02 | 2.657E−01 | 9.470E−02 | 0.000E+00 | 0.000E+00 | 0.000E+00 |
| $S_{15}$ | 0 | 3.7 | 2.845E−01 | 3.100E−01 | 8.796E−02 | 0.000E+00 | 0.000E+00 | 0.000E+00 |
| $S_{16}$ | 0 | 3.7 | 2.795E−01 | 2.231E−01 | 3.147E−02 | 0.000E+00 | 0.000E+00 | 0.000E+00 |

TABLE 16

| Lens # | Lens or group focal length [mm] |
|---|---|
| L1 | 15.76 |
| L2 | −46.69 |
| L3 | 16.75 |
| L4 | −37.57 |
| L5 | 47.27 |
| L6 | −25.34 |
| L7 | −10.23 |
| L8 | 20.23 |
| G1 | 21.49 |
| G2 | 19.76 |
| G3 | −11.20 |

Figure 4E:
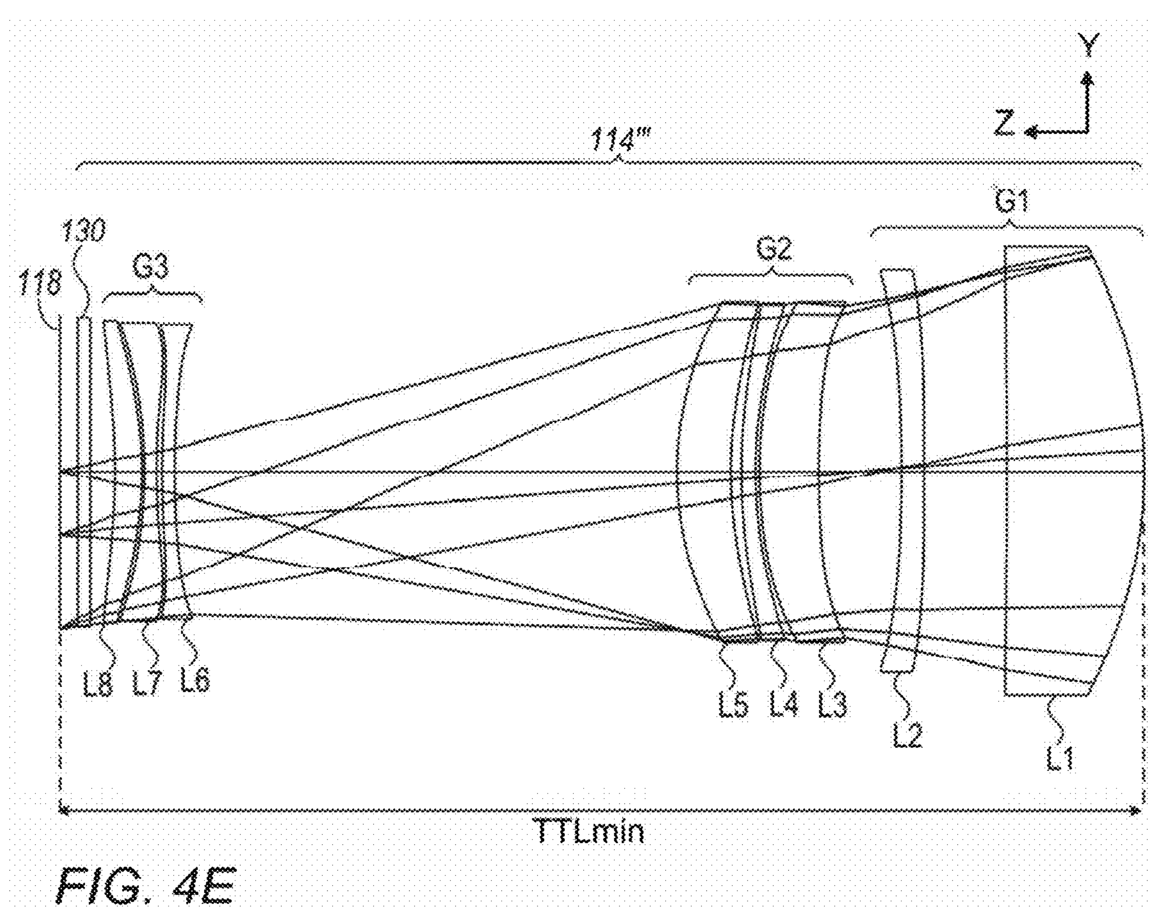
FIG. 4E shows details of the lens elements of a fifth optical design in a first zoom state.
Figure 4F:
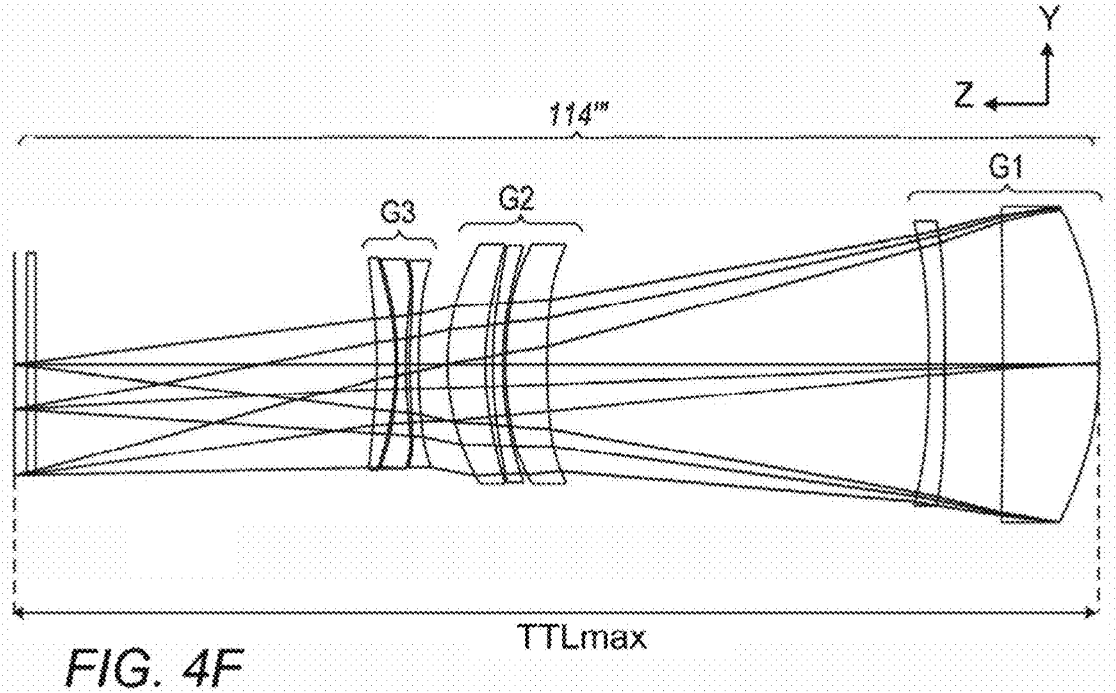
FIG. 4F shows details of the lens elements of the fifth optical design in a second zoom state.

FIG. 4E shows details of the lens elements of a fifth exemplary optical design in a folded Tele camera such as camera 103 in a first zoom state, while FIG. 4F shows details of the lens elements of the fifth optical design in a second zoom state. The figures show a lens 114"", image sensor 118 and optional window 130. The fifth optical design is represented by Tables 17-20 and includes eight lens elements marked L1-L8, starting with L1 on an object side facing the prism and ending with L8 on an image side toward the image sensor. Table 17 provides optical data, Table 18 provides zoom data, Table 19 provides aspheric data and Table 20 provides lens or group focal length in mm.

In the fifth example ("Example 5"), in lens 114"", lens elements L1-L8 are grouped into three groups: a first group G1 comprising lens elements L1 and L2, a second group G2 comprising lens elements L3-L5, and a third group comprising lens elements L6-L8.

In Example 5, the camera is brought into two zoom states by moving groups G1 and G3 together (as one unit) relative to the image sensor in a given range $R_{1,3}$ while group G2 is stationary relative to the image sensor. In Example 5, $R_{1,3}$=7.697 mm. Groups G1+G3 is further movable together at any zoom state relative to the image sensor and group G2 in a range $R_{AF}$ for changing the focal distance of camera 106 from infinity down to 2 meter. $R_{AF}$ may be up to 1.8 mm, depending on zoom state. FIG. 4E shows Example 5 in the first zoom state in which $EFL_T$=$EFL_{Tmin}$=15 mm, F #=F $\#_{Tmin}$=2 and $TTL_T$=$TTL_{Tmin}$=18.1 mm, and FIG. 4F shows Example 5 in the second zoom state in which $EFL_T$=$EFL_{Tmax}$=30 mm, F #=F $\#_{Tmax}$=4, and $TTL_T$=$TTL_{Tmax}$=25.8 mm.

In the first state, G1 is separated from G2 by a distance d4 (the distance between $S_4$ and $S_5$ in Table 18 for a case of 15 mm EFL), G2 is separated from G3 by a distance d10 (the distance between $S_{10}$ and $S_{11}$ in Table 18 for a case of 15 mm EFL) and G3 is separated from window 130 by a distance d16 (the distance between $S_{16}$ and $S_{17}$ in Table 18 for a case of 15 mm EFL). In the second state, G1 is separated from G2 by a distance d4' (the distance between $S_4$ and $S_5$ in Table 18 for a case of 30 mm EFL), G2 is separated from G3 by a distance d10' (the distance between $S_{10}$ and $S_{11}$ in Table 18 for a case of 30 mm EFL), and G3 is separated from window 130 by a distance d16' (the distance between $S_{16}$ and $S_{17}$ in Table 17 for a case of 30 mm EFL).

TABLE 17

| Group | Lens | Surface | Type | R [mm] | T [mm] | Nd | Vd | D [mm] |
|---|---|---|---|---|---|---|---|---|
| Object | | $S_0$ | Flat | Infinity | See Table 18 | | | |
| G1 | L1 | $S_1$ | QT1 | 7.595 | 2.293 | 1.4847 | 84.150 | 7.50 |
| G1 | L1 | $S_2$ | QT1 | 166.728 | 1.379 | | | 7.20 |
| G1 | L2 | $S_3$ | QT1 | 169.765 | 0.381 | 1.7978 | 22.463 | 6.73 |
| G1 | L2 | $S_4$ | QT1 | 30.296 | See Table 18 | | | 6.55 |
| G2 | L3 | $S_5$ | QT1 | −19.262 | 0.991 | 1.5348 | 55.660 | 5.61 |
| G2 | L3 | $S_6$ | QT1 | −7.798 | 0.067 | | | 5.71 |
| G2 | L4 | $S_7$ | QT1 | −7.423 | 0.235 | 1.6510 | 21.510 | 5.62 |
| G2 | L4 | $S_8$ | QT1 | −10.037 | 0.178 | | | 5.63 |
| G2 | L5 | $S_9$ | QT1 | −6.776 | 0.896 | 1.5348 | 55.660 | 5.62 |
| G2 | L5 | $S_{10}$ | QT1 | −5.279 | See Table 18 | | | 5.69 |
| G3 | L6 | $S_{11}$ | QT1 | −11.648 | 0.207 | 1.5348 | 55.660 | 4.95 |
| G3 | L6 | $S_{12}$ | QT1 | −16.086 | 0.091 | | | 4.95 |
| G3 | L7 | $S_{13}$ | QT1 | −14.227 | 0.203 | 1.5348 | 55.660 | 4.98 |
| G3 | L7 | $S_{14}$ | QT1 | 8.126 | 0.041 | | | 5.01 |
| G3 | L8 | $S_{15}$ | QT1 | 5.960 | 0.448 | 1.6510 | 21.510 | 5.03 |
| G3 | L8 | $S_{16}$ | QT1 | 8.873 | See Table 18 | | | 5.07 |
| Glass window | | $S_{17}$ | Flat | Infinity | 0.210 | 1.5168 | 64.170 | |
| | | $S_{18}$ | Flat | Infinity | 0.300 | | | |
| Image sensor | | $S_{19}$ | Flat | Infinity | 0 | | | |

TABLE 18

| | | First zoom state $EFL_T$ = 15 mm | | Second zoom state $EFL_T$ = 30 mm | |
|---|---|---|---|---|---|
| Object position Stop surface | | at infinity S1 | at 2 meters | at infinity S1 | at 2 meters |
| T [mm] | $S_0$ | Infinity | 2000 | Infinity | 2000 |
| | $S_4$ | 1.377 | 1.853 | 9.074 | 7.308 |
| | $S_{10}$ | 8.388 | 7.913 | 0.691 | 2.458 |
| | $S_{16}$ | 0.415 | 0.890 | 8.112 | 6.345 |

TABLE 19

| Surface | Conic | NR | $A_0$ | $A_1$ | $A_2$ | $A_3$ | $A_4$ | $A_5$ |
|---|---|---|---|---|---|---|---|---|
| $S_1$ | 0 | 3.7 | −3.810E−02 | −2.313E−03 | −1.826E−04 | 0.000E+00 | 0.000E+00 | 0.000E+00 |
| $S_2$ | 0 | 3.7 | −1.050E−02 | 6.271E−04 | −4.206E−05 | 0.000E+00 | 0.000E+00 | 0.000E+00 |
| $S_3$ | 0 | 3.7 | 2.425E−01 | −4.719E−03 | 1.605E−03 | 0.000E+00 | 0.000E+00 | 0.000E+00 |
| $S_4$ | 0 | 3.7 | 2.621E−01 | −4.538E−03 | 1.794E−03 | 0.000E+00 | 0.000E+00 | 0.000E+00 |
| $S_5$ | 0 | 3.7 | −7.571E−01 | −2.386E−02 | 1.173E−02 | 0.000E+00 | 0.000E+00 | 0.000E+00 |
| $S_6$ | 0 | 3.7 | −3.239E−01 | −4.277E−02 | 1.470E−02 | 0.000E+00 | 0.000E+00 | 0.000E+00 |
| $S_7$ | 0 | 3.7 | 8.636E−02 | −6.570E−02 | −2.140E−02 | 0.000E+00 | 0.000E+00 | 0.000E+00 |
| $S_8$ | 0 | 3.7 | 1.137E−01 | −5.791E−02 | −2.009E−02 | 0.000E+00 | 0.000E+00 | 0.000E+00 |
| $S_9$ | 0 | 3.7 | 2.911E−01 | −9.503E−02 | 2.344E−04 | 0.000E+00 | 0.000E+00 | 0.000E+00 |
| $S_{10}$ | 0 | 3.7 | 1.470E−01 | −4.954E−02 | −3.365E−03 | 0.000E+00 | 0.000E+00 | 0.000E+00 |
| $S_{11}$ | 0 | 3.7 | 3.957E−01 | 3.980E−01 | 2.043E−01 | 0.000E+00 | 0.000E+00 | 0.000E+00 |
| $S_{12}$ | 0 | 3.7 | 1.263E+00 | 5.363E−03 | −8.070E−02 | 0.000E+00 | 0.000E+00 | 0.000E+00 |
| $S_{13}$ | 0 | 3.7 | 9.897E−01 | −2.343E−01 | −2.471E−01 | 0.000E+00 | 0.000E+00 | 0.000E+00 |
| $S_{14}$ | 0 | 3.7 | −3.191E−01 | −1.890E−01 | −3.206E−02 | 0.000E+00 | 0.000E+00 | 0.000E+00 |
| $S_{15}$ | 0 | 3.7 | −1.999E+00 | −7.518E−01 | −2.345E−01 | 0.000E+00 | 0.000E+00 | 0.000E+00 |
| $S_{16}$ | 0 | 3.7 | −1.561E+00 | −4.492E−01 | −1.770E−01 | 0.000E+00 | 0.000E+00 | 0.000E+00 |

TABLE 20

| Lens # | Lens or group focal length [mm] |
|---|---|
| L1 | 16.31 |
| L2 | −45.91 |
| L3 | 23.68 |
| L4 | −45.03 |
| L5 | 36.78 |
| L6 | −79.93 |
| L7 | −9.60 |
| L8 | 26.08 |
| G1 | 22.79 |
| G2 | 21.82 |
| G3 | −12.37 |

Figure 4G:
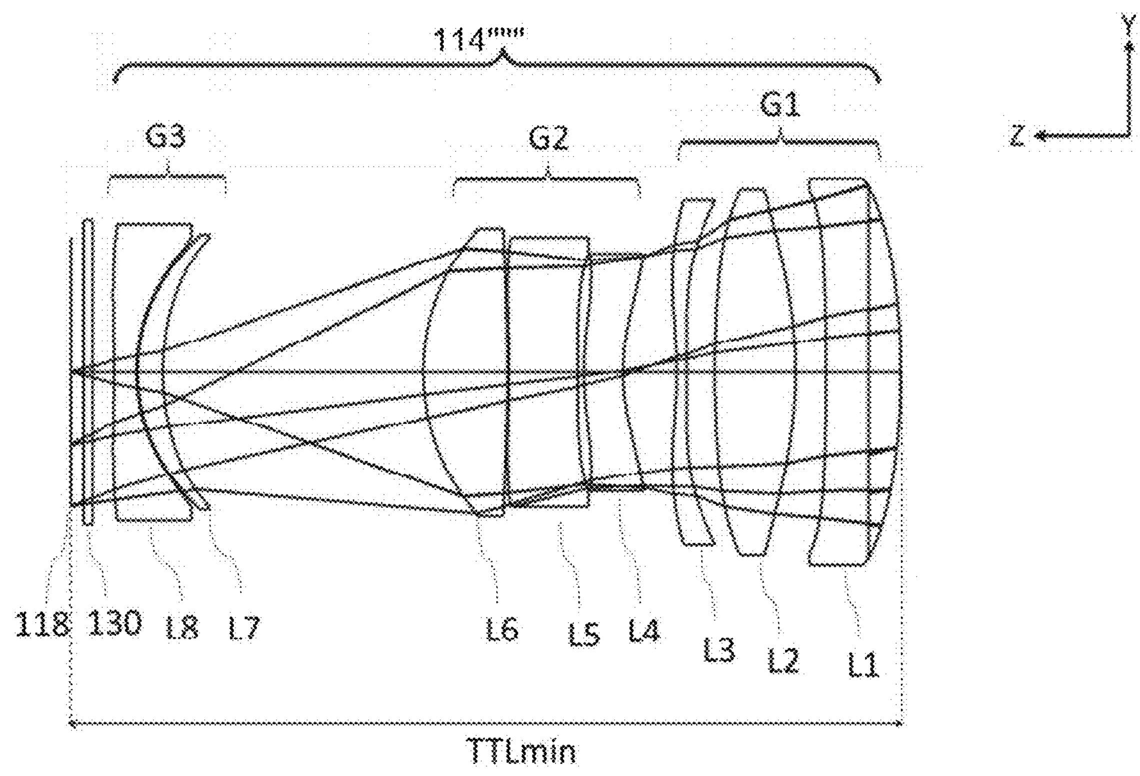
FIG. 4G shows details of the lens elements of a sixth optical design in a first zoom state.
Figure 4H:
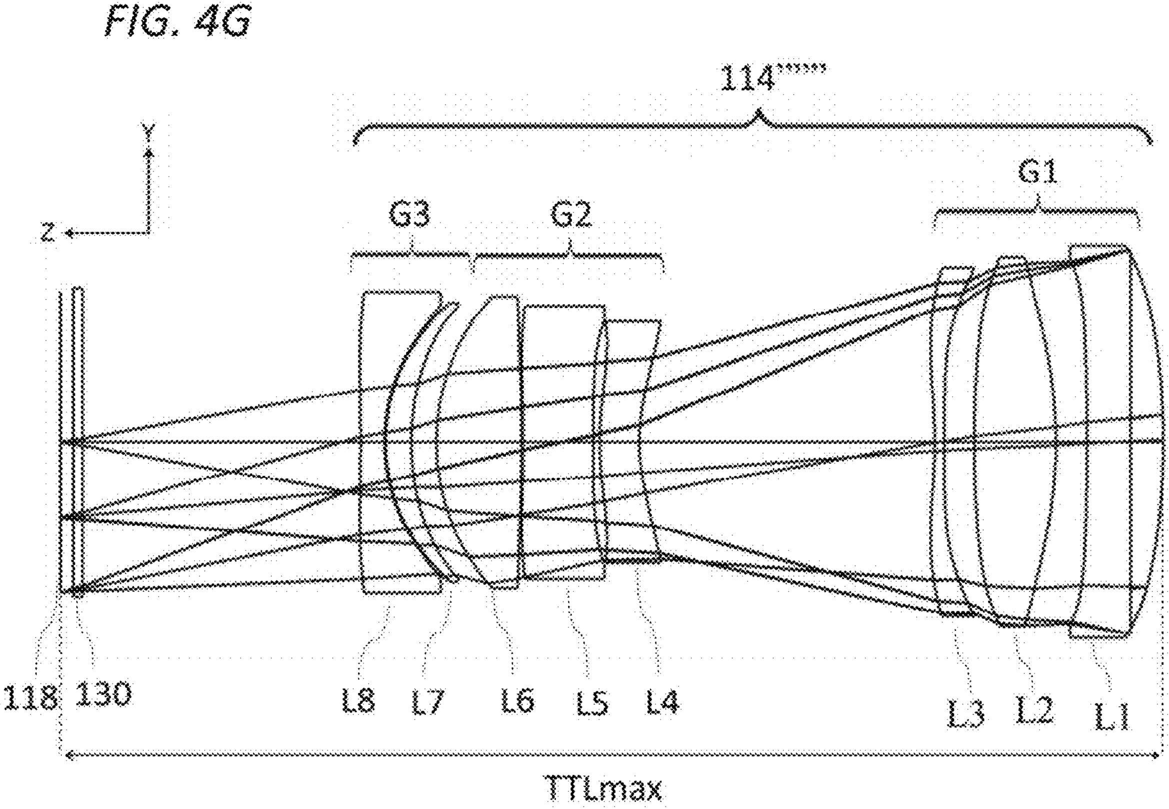
FIG. 4H shows details of the lens elements of the sixth optical design in a second zoom state.

FIG. 4G shows details of the lens elements of a sixth embodiment of an exemplary optical design in a folded Tele camera such as camera 103 in a first zoom state, while FIG. 4H shows details of the lens elements of the sixth optical design in a second zoom state. The figures show a lens 114""", image sensor 118 and optional window 130. The sixth optical design is represented by Tables 21-24 and includes eight lens elements marked L1-L8, starting with L1 on an object side facing the prism and ending with L8 on an image side toward the image sensor. Table 21 provides optical data, Table 22 provides zoom data, Table 23 provides aspheric data and Table 24 provides lens or group focal length in mm.

In lens 114""" lens elements L1-L8 are grouped into three groups: a first group G1 comprising lens elements L1, L2 and L3, a second group G2 comprising lens elements L4, L5 and L6, and a third group comprising lens elements L7 and L8.

In Example 6, the camera is brought into two zoom states by moving groups G1 and G3 together (as one unit) relative to the image sensor in a given range $R_{1,3}$ while group G2 moves in a range $R_2$ relative to the image sensor, whereas $R_2<R_{1,3}$. In Example 6, $R_{1,3}$=5.641 mm and $R_2$=0.718. Groups G1+G2+G3 is further movable together at any zoom state relative to the image sensor and in a range $R_{AF}$ for changing the focal distance of camera 106 from infinity down to 1 meter or down to 2 meter. $R_{AF}$ may be up to 0.4 mm, depending on zoom state.

FIG. 4G shows Example 6 in the first zoom state in which $EFL_T=EFL_{Tmin}$=13 mm, F #=F $\#_{Tmin}$=1.8 and $TTL_T = TTL_{Tmin}$=19.84 mm, and FIG. 4H shows Example 6 in the second zoom state in which $EFL_T = EFL_{Tmax}$=26 mm, F #=F $\#_{Tmax}$=2.88, and $TTL_T = TTL_{Tmax}$=25.85 mm.

In the first state, G1 is separated from G2 by a distance d7 (the distance between $S_7$ and $S_8$ in Table 22 for a case of 13 mm EFL), G2 is separated from G3 by a distance d13 (the distance between $S_{13}$ and $S_{14}$ in Table 22 for a case of 13 mm EFL) and G3 is separated from window 130 by a distance d17 (the distance between $S_{17}$ and $S_{18}$ in Table 22 for a case of 13 mm EFL). In the second state, G1 is separated from G2 by a distance d7' (the distance between $S_7$ and $S_8$ in Table 22 for a case of 26 mm EFL), G2 is separated from G3 by a distance d13' (the distance between $S_{13}$ and $S_{14}$ in Table 22 for a case of 26 mm EFL), and G3 is separated from window 130 by a distance d17' (the distance between $S_{17}$ and $S_{18}$ in Table 21 for a case of 26 mm EFL).

TABLE 21

| Group | Lens | Surface | Type | R [mm] | T [mm] | Nd | Vd | D [mm] |
|---|---|---|---|---|---|---|---|---|
| Object | | $S_0$ | Flat | Infinity | See Table 2 | | | |
| Stop | | $S_1$ | Flat | Infinity | −0.775 | | | 9.000 |
| G1 | L1 | $S_2$ | QFORB type 1 | 17.302 | 1.786 | 1.5661 | 37.43 | 8.577 |
| G1 | L1 | $S_3$ | QFORB type 1 | 62.771 | 0.725 | | | 8.652 |
| G1 | L2 | $S_4$ | QFORB type 1 | 10.090 | 1.928 | 1.5449 | 55.91 | 8.557 |
| G1 | L2 | $S_5$ | QFORB type 1 | −23.147 | 0.689 | | | 8.086 |
| G1 | L3 | $S_6$ | QFORB type 1 | 80.507 | 0.232 | 1.6991 | 19.44 | 8.073 |
| G1 | L3 | $S_7$ | QFORB type 1 | 10.360 | See Table 2 | | | 5.509 |
| G2 | L4 | $S_8$ | QFORB type 1 | −4.430 | 0.928 | 1.5449 | 55.91 | 5.543 |
| G2 | L4 | $S_9$ | QFORB type 1 | −7.104 | 0.144 | | | 5.555 |
| G2 | L5 | $S_{10}$ | QFORB type 1 | 440.072 | 1.646 | 1.6991 | 19.44 | 6.397 |
| G2 | L5 | $S_{11}$ | QFORB type 1 | 28.935 | 0.033 | | | 6.494 |
| G2 | L6 | $S_{12}$ | QFORB type 1 | 39.391 | 2.010 | 1.5449 | 55.91 | 6.726 |
| G2 | L6 | $S_{13}$ | QFORB type 1 | −5.075 | See Table 2 | | | 6.322 |
| G3 | L7 | $S_{14}$ | QFORB type 1 | −6.250 | 0.601 | 1.6991 | 19.44 | 6.435 |
| G3 | L7 | $S_{15}$ | QFORB type 1 | −4.314 | 0.033 | | | 6.292 |
| G3 | L8 | $S_{16}$ | QFORB type 1 | −4.226 | 0.553 | 1.5449 | 55.91 | 6.944 |
| G3 | L8 | $S_{17}$ | QFORB type 1 | 45.368 | See Table 2 | | | 7.179 |
| Glass window | | $S_{18}$ | Flat | Infinity | 0.21 | 1.5168 | 64.17 | 7.235 |
| | | $S_{19}$ | Flat | Infinity | 0.3 | | | 7.000 |
| Image sensor | | $S_{20}$ | Flat | Infinity | 0 | | | 7.000 |

TABLE 22

| | | First zoom state $EFL_T$ = 13 mm | | Second zoom state $EFL_T$ = 26 mm | |
|---|---|---|---|---|---|
| Object position | | at infinity | at 1 meter | at infinity | at 2 meter |
| Stop surface | | S8 | | S1 | |
| T [mm] | $S_0$ | Infinity | 1000 | Infinity | 2000 |
| | $S_7$ | 1.287 | 1.287 | 6.928 | 6.928 |
| | $S_{13}$ | 6.224 | 6.224 | 0.584 | 0.584 |
| | $S_{17}$ | 0.510 | 0.680 | 6.527 | 6.869 |

TABLE 23

| Surface | Conic (k) | NR | $A_2$ | $A_2$ | $A_3$ | A4 |
|---|---|---|---|---|---|---|
| $S_2$ | 0 | 4.500 | 1.937E−01 | 3.246E−02 | 1.318E−03 | 2.280E−04 |
| $S_3$ | 0 | 4.500 | 2.594E−01 | 8.795E−02 | 5.484E−03 | 3.649E−03 |
| $S_4$ | 0 | 4.000 | −1.694E−01 | 7.487E−04 | −3.651E−03 | 1.653E−03 |
| $S_5$ | 0 | 4.000 | −8.607E−02 | −4.556E−02 | 9.328E−03 | −1.115E−04 |
| $S_6$ | 0 | 4.000 | −8.318E−01 | 8.107E−02 | −3.312E−03 | 1.627E−04 |
| $S_7$ | 0 | 3.600 | −7.475E−01 | 6.703E−02 | −6.921E−03 | 5.168E−04 |
| $S_8$ | 0 | 3.540 | 1.184E+00 | −7.816E−02 | 6.294E−03 | −5.495E−03 |
| $S_9$ | 0 | 3.540 | 1.068E+00 | −3.634E−02 | 4.046E−03 | −3.309E−03 |
| $S_{10}$ | 0 | 3.540 | −7.538E−01 | −8.548E−02 | −3.579E−02 | −4.211E−03 |
| $S_{11}$ | 0 | 3.540 | −3.354E−01 | 5.277E−03 | −9.014E−03 | −8.400E−04 |
| $S_{12}$ | 0 | 3.540 | −6.434E−02 | −5.113E−04 | 3.479E−04 | −1.573E−03 |
| $S_{13}$ | 0 | 3.540 | 5.865E−03 | 1.176E−03 | 3.052E−03 | 5.638E−04 |
| $S_{14}$ | 0 | 3.540 | −3.496E−01 | −4.291E−02 | −1.806E−02 | −1.974E−03 |
| $S_{15}$ | 0 | 3.540 | −9.519E−03 | 2.425E−02 | −8.039E−03 | −5.814E−03 |
| $S_{16}$ | 0 | 3.540 | 2.311E−01 | 7.899E−02 | 9.116E−03 | −5.414E−03 |
| $S_{17}$ | 0 | 3.540 | −2.319E−01 | 8.502E−03 | −2.231E−04 | −1.988E−04 |

TABLE 24

| Lens # | Lens or group focal length [mm] |
|---|---|
| L1 | 41.40 |
| L2 | 13.12 |
| L3 | −17.63 |
| L4 | −24.54 |
| L5 | −45.94 |
| L6 | 8.36 |
| L7 | 18.33 |
| L8 | −7.04 |

TABLE 24-continued

| Lens # | Lens or group focal length [mm] |
|---|---|
| G1 | 19.31 |
| G2 | 12.82 |
| G3 | −10.82 |

Figure 5A:
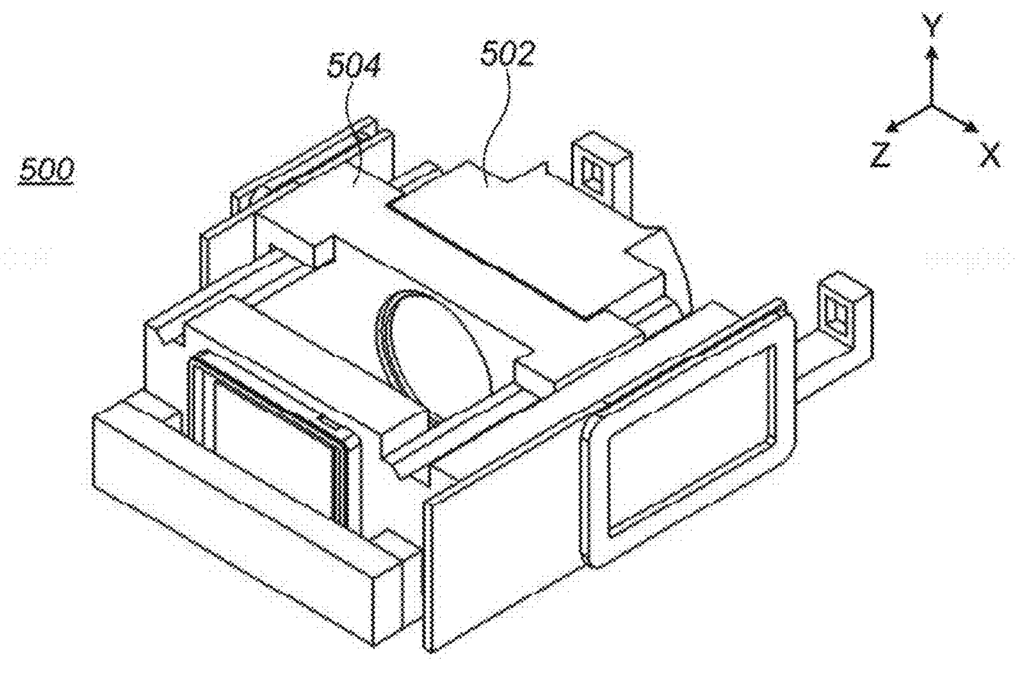
FIG. 5A shows schematically a Tele lens and sensor module with a lens having the optical design of the second example in a $EFL_{Tmin}$ state from a top perspective view.
Figure 5B:
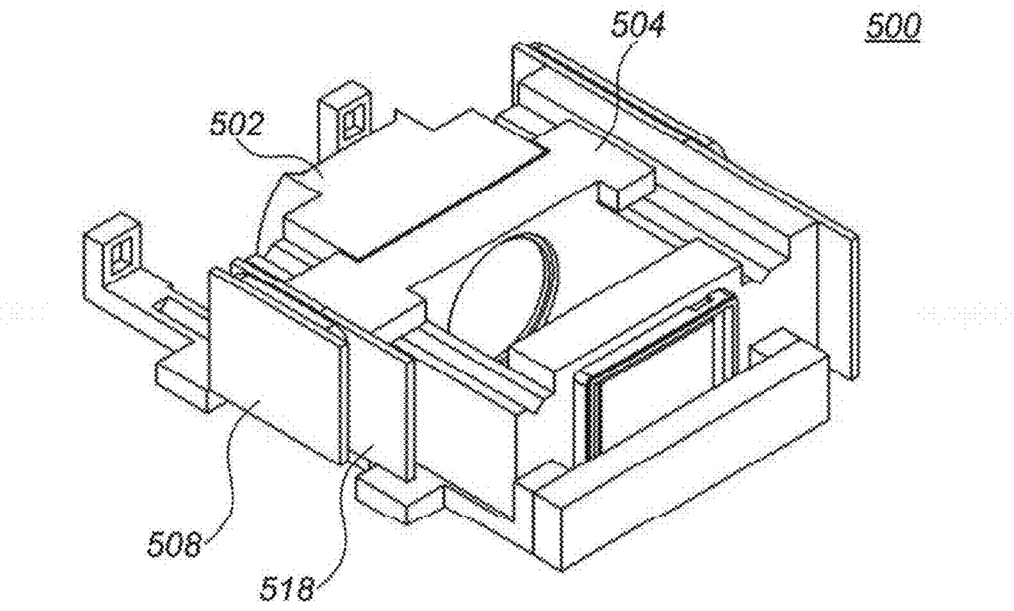
FIG. 5B shows schematically the Tele lens and sensor module of FIG. 5A from another top perspective view.
Figure 5C:
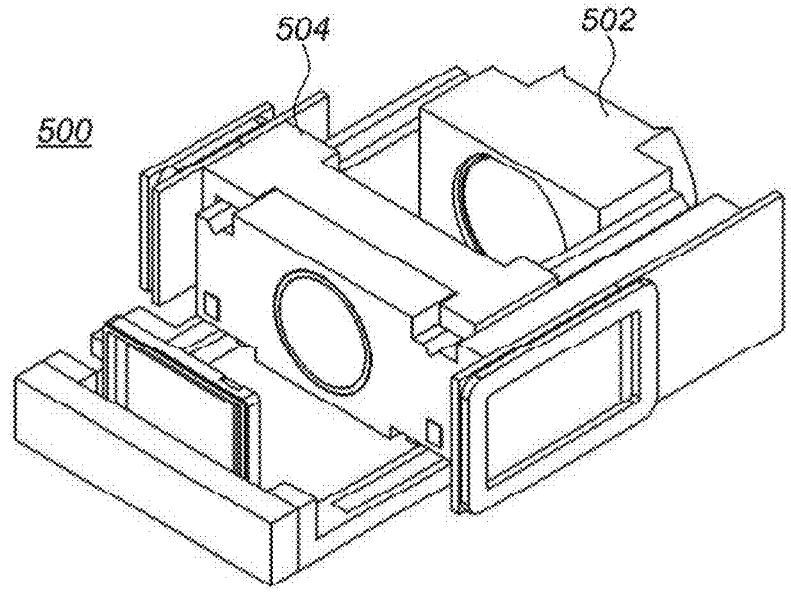
FIG. 5C shows schematically the Tele lens and sensor module with a lens having the optical design of the second example in a $EFL_{Tmax}$ state from one top perspective view.
Figure 5D:
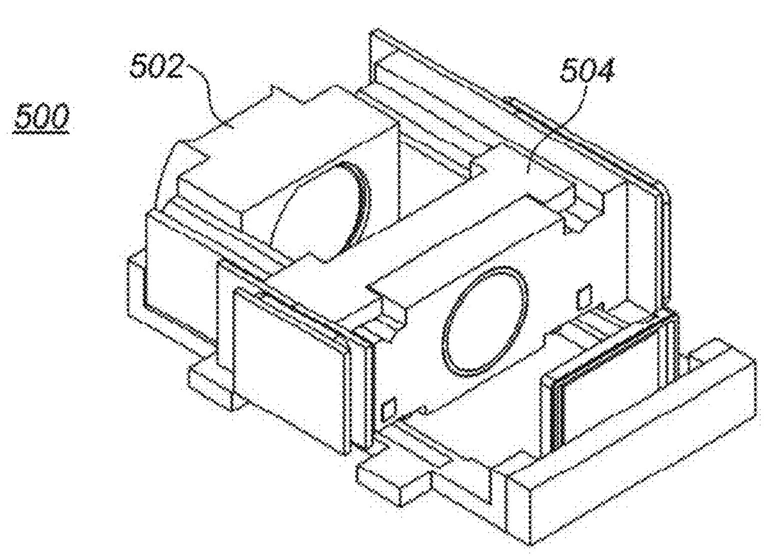
FIG. 5D shows schematically the Tele lens and sensor module of FIG. 5C from another top perspective view.
Figure 5E:
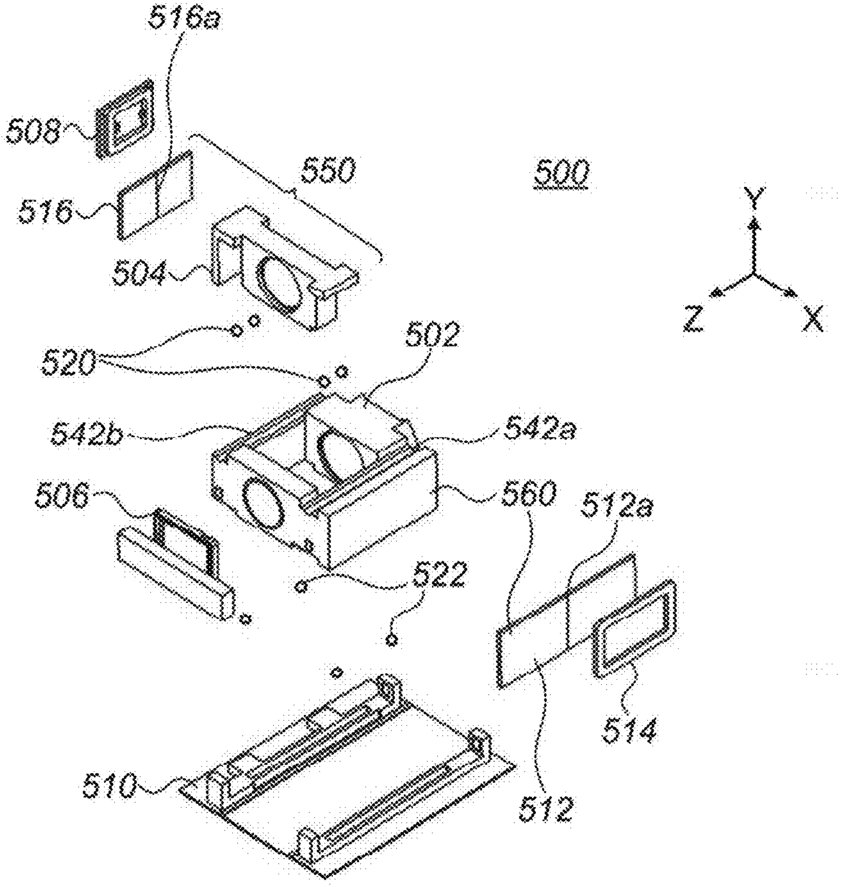
FIG. 5E shows an exploded view of the Tele lens and sensor module of FIGS. 5A-5D.

FIG. 5A-E show schematically an example for Tele lens and sensor module (or simply "module") numbered 500. The description of the figures continues with reference to a coordinate system XYZ shown in FIGS. 5A-E as well as in a number of other figures. In an example, module 500 has the optical design of the second example. In module 500, an example for an actuation method required for changing between zoom states and focus states of lenses 114', 114" and 114''' is provided. FIG. 5A shows schematically module 500 in an $EFL_{Tmin}$ state from a top perspective view, and FIG. 5B shows schematically module 500 in the $EFL_{Tmin}$ state from another top perspective view. FIG. 5C shows schematically module 500 in an $EFL_{Tmax}$ state from one top perspective view, and FIG. 5D shows schematically module 500 in the $EFL_{Tmax}$ state from another top perspective view. FIG. 5E shows an exploded view of module 500. Module 500 comprises a G1+G3 lens sub-assembly 502, a G2 lens sub-assembly 504, a sensor sub-assembly 506, an electro-magnetic (EM) sub-assembly 508, a base sub-assembly 510, a first magnet 512, a first coil 514, a second magnet 516, a first set of (exemplarily 4) balls 520 and a second set of (exemplarily 4) balls 522. Lens sub-assemblies 502 and 504 share lens optical axis 116.

First coil 514 is positioned next to first magnet 512 and is rigidly coupled to (not moving relative to) base sub-assembly 510. First coil 514 may be soldered to a PCB such as PCB 822 (FIG. 8), or routed to external circuitry (not shown) which allows sending input and output currents to first coil 514, the currents carrying both power and electronic signals required for operation. Coil 514 has exemplarily a rectangular shape and typically includes a few tens of coil windings (i.e. in a non-limiting range of 50-250), with a typical resistance of 10-30 ohm. First magnet 512 is a split magnet, such that a split line 512*a* in the middle separates it into two sides: in one side of split line 512*a*, magnet 512 has a north magnetic pole facing the positive X direction, and in the other side of split line 512*a*, magnet 512 has a south magnetic pole facing the positive X direction. Upon driving a current in first coil 514, a first Lorentz force is created on first magnet 512. In an example, a current flow through first coil 514 in a clockwise direction will induce a first Lorentz force in the positive Z direction on first magnet 512, while a current flow through first coil 512 in a counter clockwise direction will induce a Lorentz force in the negative Z direction on first magnet 512. In an example, first Lorentz force may be used to move bottom actuated sub-assembly 560 from the first zoom state to the second zoom state and vice-versa in an open loop control, i.e. actuate bottom actuated sub-assembly 560 between stops 720*a-b* and 722*a-b* (see below).

Figure 6A:
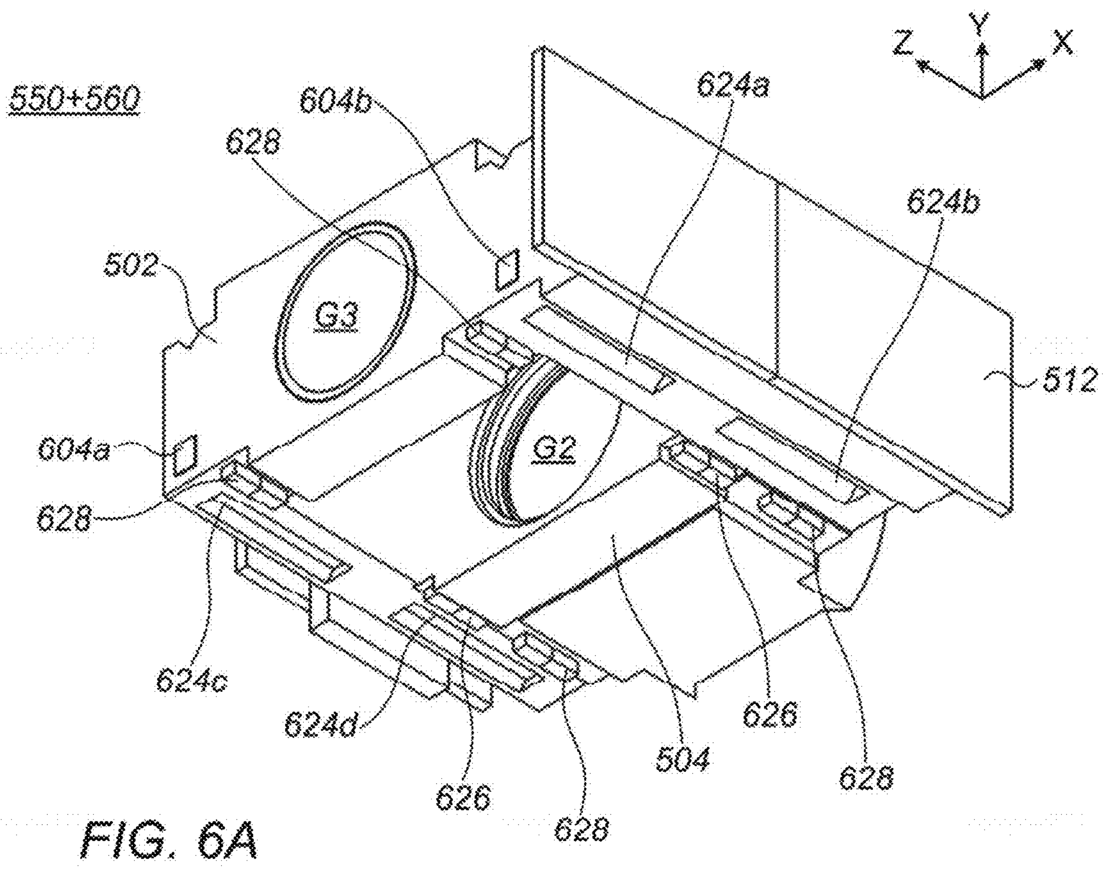
FIG. 6A shows a bottom view of the top and bottom actuated sub-assemblies of Tele lens and sensor module in the $EFL_{Tmin}$ state like in FIGS. 5A and 5B from one perspective.
Figure 6B:
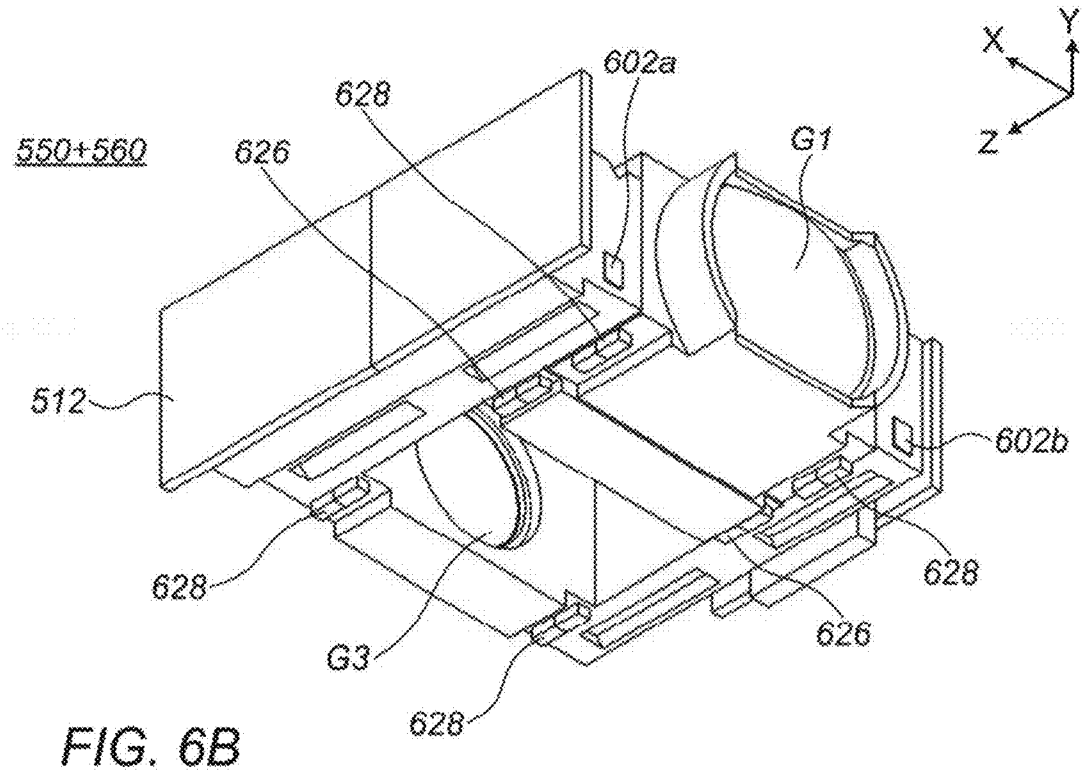
FIG. 6B shows a bottom view of the top and bottom actuated sub-assemblies of Tele lens and sensor module in the $EFL_{Tmax}$ state like in FIGS. 5C and 5D from another perspective.
Figure 6C:
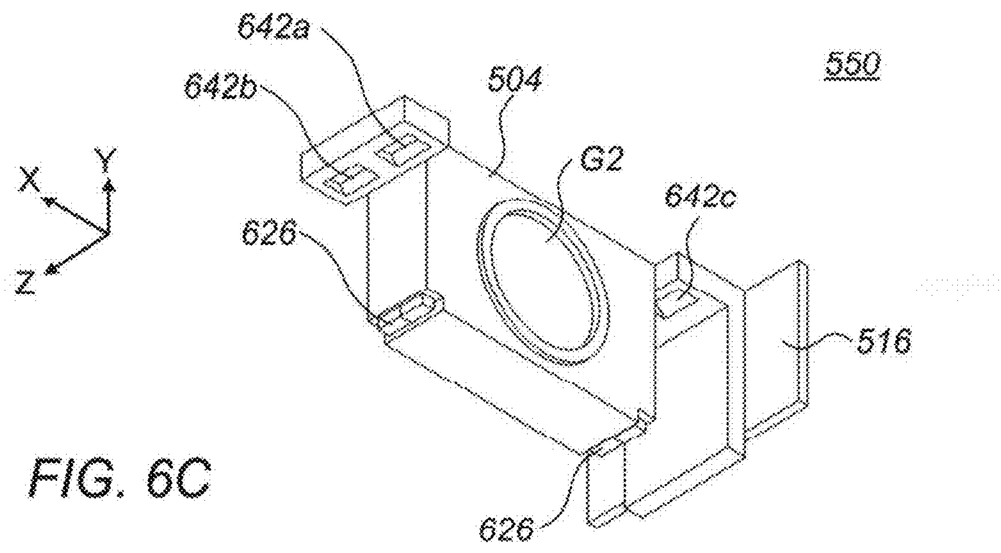
FIG. 6C shows the top actuated sub-assembly from a bottom view.
Figure 7:
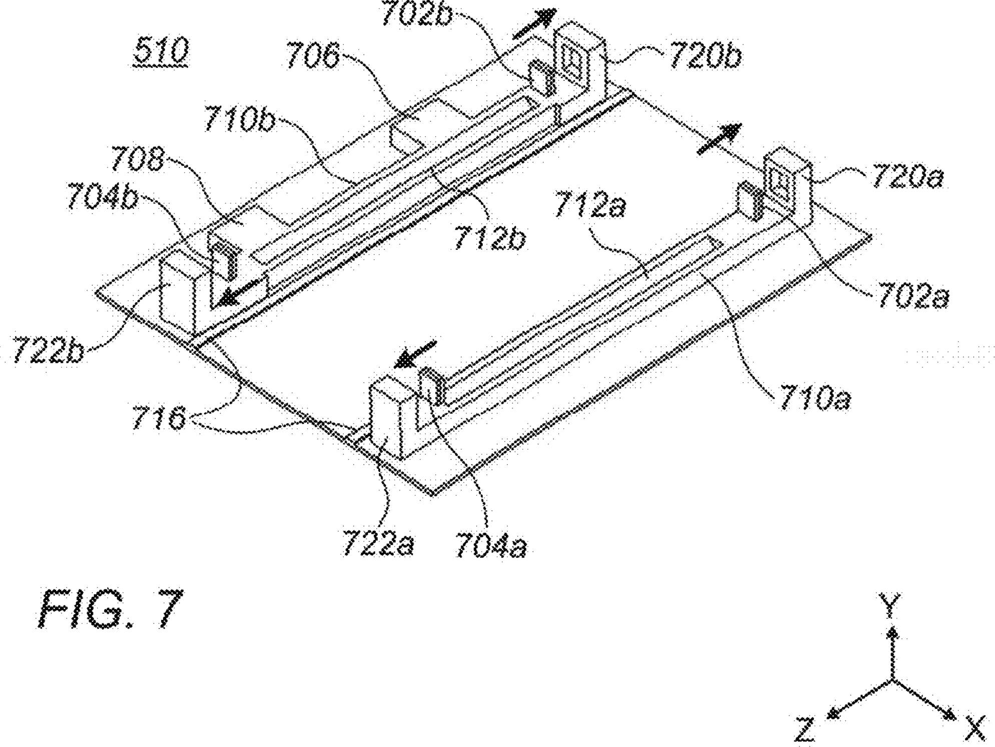
FIG. 7 shows details of stationary rails in the Tele lens and sensor module of FIG. 5.

FIGS. 6A and 6B provide two bottom perspective views of actuated parts of module 500, showing a top actuated sub-assembly 550 and a bottom actuated sub-assembly 560 in the $EFL_{Tmin}$ state. FIG. 6C shows top actuated sub-assembly 550 from a bottom perspective view. Top actuated sub-assembly 550 comprises G2 lens sub-assembly 504, second magnet 516 and a plurality of stepping magnets 626. Bottom actuated sub-assembly 560 comprises G1+G3 lens sub-assembly 502, first magnet 512, stepping magnets 628 and four yokes 602*a-b* (FIG. 6B) and 604*a-b* (FIG. 6A). FIG. 7 shows details of base sub-assembly 510, which comprises guiding rails 710*a* and 710*b* and pull-stop magnets 702*a-b* and 704*a-b*. Note that in FIG. 7, pull-stop magnets 702*a-b* and 704*a-b* are separated from stops 720*a-b* and 722*a-b* for illustration purposes. Arrows show the gluing position of pull-stop magnets 702*a-b* and 704*a-b* in stops 720*a-b* and 722*a-b*. Yokes 602*a-b* are pulled against pull-stop magnets 702*a-b* and yokes 604*a-b* are pulled against pull-stop magnets 704*a-b*. Each of guiding rails 710*a-b* comprises a respective groove 712*a-b*. Base sub-assembly 510 further comprises two mechanical stops 706 and 708, which are exemplarily connected to guiding rail 710*b*. Mechanical stops 706 and 708 limit the stroke of top actuated sub-assembly 550. FIG. 8 shows details of EM sub-assembly 508 on PCB 822.

In an example, module 500 enables a relative motion of lens sub-assemblies 502 and 504 in a direction along lens optical axis 116. Module 500 has exemplary length/width/height dimensions in the range of 3-40 mm, i.e. module 500 can be contained in a box with dimension of 3×3×3 $mm^3$ to 40×40×40 $mm^3$. In an example, module 500 has a height (along Y axis) which is limited by the maximal clear apertures of lens elements L1 . . . LN plus the plastic thickness of respective lens sub-assemblies 502 and 504 (the plastic thickness is for example in the range 0.5-1.5 mm), plus the thickness of shield 107 (the shield thickness is for example in the range 0.1-0.3 mm), plus the thickness of two airgaps between respective lens sub-assemblies 502 and 504 and shield 107 (each air gap thickness is for example in the range of 0.05-0.15 mm). The clear aperture of lens elements L1 . . . LN may be a circular or cut-lens clear aperture, as described below.

In module 500, the three lens groups (G1, G2 and G3) are held in two lens sub-assemblies: lens sub-assembly 502 that holds lens groups G1+G3 and lens sub-assembly 504 that holds lens group G2. Lens sub-assemblies 502 and 504 are typically made of plastic. In some embodiments, lens sub-assembly 502 and lens groups G1+G3 may be a single part (and similarly lens sub-assembly 504 and G2 may be a single part). In some embodiments, they may be separate parts. Lens sub-assemblies 502 and 504 may be made, for example, by plastic molding, or alternatively by other methods. First and second magnets 512 and 516 are fixedly attached (e.g. glued) to lens sub-assemblies 502 and 504, respectively, from two opposite sides across lens optical axis 116 (X direction).

Lens sub-assembly 502 includes several grooves, defining a mechanical ball-guided mechanism, allowing actuation in a linear rail for the zoom needs. In this example, six grooves are described, but another number of grooves may be used: two grooves 542*a-b* (FIG. 5E) on a top surface of lens sub-assembly 502 along the Z direction, and four grooves 624*a-d* (FIG. 6A) on a bottom surface of lens sub-assembly 502, along the Z direction as well. Lens sub-assembly 504 includes several groves, mating with some of the grooves of lens sub-assembly 502. In the embodiment shown, lens sub-assembly 504 includes four grooves 642*a-d*, only three of which are seen in FIG. 6C. Grooves 642*a-d* are parallel to each other, are along the Z-axis (optical axis), and are used to guide top actuated sub-assembly 550 along the Z direction.

Top actuated sub-assembly 550 is positioned on top of bottom actuated sub-assembly 560 such that grooves 642*a-b* (642*c-d*) are right above and parallel to grooves 542*a* (542*b*).

In the embodiment shown, four balls 520 are positioned on top of grooves 542*a-b* (two balls on top of each groove) and below grooves 642*a-d* (FIG. 6C), such that balls 520 separate lens sub-assembly 502 and lens sub-assembly 504 and prevent the two parts from touching each other. In other embodiments, module 500 may have more than four balls between lens sub-assemblies 502 and 504, for example up to 7 balls per side or up to 14 balls in total. Balls 520 may be made from aluminum oxide or another ceramic material, from a metal or from a plastic material. Typical ball diameters may be in a non-limiting range of 0.3-1 mm. Other ball sizes and positioning considerations may be, as in co-owned international PCT patent application PCT/IB2017/052383 titled "Rotational Ball Guided Voice Coil Motor".

Since lens sub-assemblies 502 and 504 are exemplarily plastic molded, there is some tolerance allowed in part dimensions, typically a few tens of microns or less for each dimension. This tolerance may lead to positional misalignment between adjacent (facing) grooves 542*a-b* and 642*a-d*. To better align the grooves, some grooves (e.g. 542*a-b* and 642*c-d*) may be V-shaped, i.e. have a V cross section shape to ensure ball positioning, while grooves 642*a-b* may have a wider, trapezoid cross-section. Grooves 542*b* and 642*c-d* are aligned during assembly, while the alignment of grooves 542*a* and 642*a-b* have a small clearance due to the trapezoid cross section of the latter grooves. The trapezoid groove cross sections are just exemplary, and other groove cross section shapes may be used (e.g. rectangular, flat, etc.), such that one pair of grooves is well aligned by the groove shape and the other pair of grooves has clearance of alignment.

The design presented herein may allow accurate alignment of the three lens element groups. G1 and G3 are well aligned to each other since they are mechanically fixed to the same part and may maintain alignment during product lifecycle. In some embodiments, lens sub-assembly 504 is molded as one part and the alignment of G1 to G3 is based on the plastic molding tolerances. In some embodiments lens sub-assembly 504 is molded as several parts which are glued in the factory using active or passive alignment procedures. G2 is aligned to G1 and G3 using a single groove pair (542*b* and 642*c* and/or 642*d*), i.e. lens sub-assemblies 502 and 504 are aligned to each other without intermediate parts.

Four balls 522 are positioned on top of grooves 712*a-b* (two balls on top of each groove) and below grooves 624*a-d* such that balls 522 separate lens sub-assembly 502 from base sub-assembly 510 and prevent the two parts from touching each other. In other embodiments, module 500 may have more than four balls, for example up to 7 balls per side or up to 14 balls in total. The size, material and other considerations related to balls 522 are similar to those of balls 520. Other considerations regarding grooves 712*a-b* and 624*a-d* are similar to those of grooves 542*a-b* and 642*a-d* as described above.

Module 500 further includes several ferromagnetic yokes 716 (FIG. 7) fixedly attached (e.g. glued) to base sub-assembly 510 such that each yoke is positioned below (along Y direction) three of stepping magnets 626 and 628. In other embodiments, ferromagnetic yokes 716 may be a fixedly part of shield 107. In yet other embodiments, shield 107 by itself may be made from ferromagnetic material, or the bottom part of shield 107 may be made of ferromagnetic material, such that the yoke(s) is (are) part of the shield. Each ferromagnetic yoke 716 pulls some of stepping magnets 626 or 628 by magnetic force in the negative Y direction, and thus all yokes prevent both top actuated sub-assembly 550 and bottom actuated sub-assembly 560 from detaching from each other and from base 510 and shield 107. Balls 520 prevent top actuated sub-assembly 550 from touching bottom actuated sub-assembly 560 and balls 522 prevent bottom actuated sub-assembly 560 from touching base sub-assembly 510. Both top actuated sub-assembly 550 and bottom actuated sub-assembly 560 are thus confined along the Y-axis and do not move in the Y direction. The groove and ball structure further confines top actuated sub-assembly 550 and bottom actuated sub-assembly 560 to move only along lens optical axis 116 (Z-axis).

FIG. 7 shows details of base sub-assembly 510 and stationary rails in module 500. Along the Z direction, top actuated sub-assembly 550 is limited to move between mechanical stops 706 and 708, with a distance equal to the required stroke of G2 (about 1-3 mm) between them. Also, along the Z direction, bottom actuated sub-assembly 560 is limited to move between mechanical stops 720*a-b* and 722*a-b*, and/or pull-stop magnets 702*a-b* and 704*a-b*.

FIG. 8 shows details of EM sub-assembly 508 in module 500. EM sub-assembly 508 includes second coil 818, two Hall bar elements ("Hall sensors") 834*a* and 834*b* and a PCB 822. Second Coil 818 and Hall bar elements 834*a-b* may be soldered (each one separately) to PCB 822. Second Coil 818 has exemplarily a rectangular shape and typically includes a few tens of coil windings (e.g. in a non-limiting range of 50-250), with a typical resistance of 10-40 ohms. PCB 822 allows sending input and output currents to second coil 818 and to Hall bar elements 834*a-b*, the currents carrying both power and electronic signals required for operation. PCB 822 may be connected electronically to the external camera by wires (not shown). In an example (FIG. 5E), EM sub-assembly 508 is positioned next to second magnet 516. Second magnet 516 is a split magnet, separated by a split line 516*a* in the middle into two sides: in one side of split line 516*a*, magnet 516 has a north magnetic pole facing the positive X direction, and in the other side of split line 516*a*, magnet 516 has a south magnetic pole facing the positive X direction. Upon driving a current in second coil 818, a Lorentz force is created on second magnet 516. In an example, a current flow through second coil 818 in a clockwise direction will induce a Lorentz force in the positive Z direction on second magnet 516, while a current flow through second coil 818 in a counter clockwise direction will induce a Lorentz force in the negative Z direction on second magnet 516.

Hall bar elements 834*a-b* are designed to measure magnetic the field in the X direction (intensity and sign) in the center of each Hall bar element. Hall bar elements 834*a-b* can sense the intensity and direction of the magnetic field of second magnet 516. In an example, the positioning of Hall bar element 834*a* on PCB 822 is such that:

1. In the X direction, both Hall bar elements 834*a* and 834*b* are separated from magnet 516 by a distance (e.g. 0.1-0.5 mm), the distance being constant while magnet 516 is moving for zoom or focus needs.
2. When the system is in a first zoom state ($EFL_T$=15 mm), Hall bar element 834*a* is close to split line 516*a* along the Z direction. For example, for all focus positions in the first state zoom (infinity to 1 meter macro continuously), Hall element 834*a* is distanced along the Z direction from split line 516*a* by up $R_{AF}$.
3. When the system is in a second zoom state ($EFL_T$=30 mm), Hall bar element 834*b* is close to split line 516*a* along the Z direction. For example, for all focus positions in the first state zoom (infinity to 1 meter macro continuously), Hall element 834*b* is distanced along the Z direction from split line 516*a* by up $R_{AF}$.

In such a positioning scheme, Hall bar element 834_a_ can measure the respective position of second magnet 516 along the Z direction when the system is in the first zoom state, since in the first zoom state the X direction magnetic field has measurable gradient on Hall bar 834_a_ trajectory along $R_{AF}$ between focus positions of infinity to 1 meter focus, and X direction magnetic field may be correlated to position. In addition Hall bar element 834_b_ can measure the respective position of second magnet 516 along the Z direction when the system is in the second zoom state, since in the second zoom state the X direction magnetic field has measurable gradient on Hall bar 834_b_ trajectory along $R_{AF}$ between focus positions of infinity to 1 meter focus, and X direction magnetic field may be correlated to position. A control circuit (not shown) may be implemented in an integrated circuit (IC) to control in closed loop the position of second magnet 516 relative to EM sub-assembly 508 (and to base sub-assembly 510 to which EM sub-assembly 508 is rigidly coupled) while operating in either zoom states, and in open loop while traveling between zoom state (see FIG. 10 and description below) In some cases, the IC may be combined with one or both Hall elements 834_a-b_. In other cases, the IC may be a separate chip, which can be located outside or inside module 500 (not shown). In exemplary embodiments, all electrical connections required by module 500 are connected to EM sub-assembly 508, which is stationary relative to base sub-assembly 510 and to the external world. As such, there is no need to transfer electrical current to any moving part.

Figure 10:
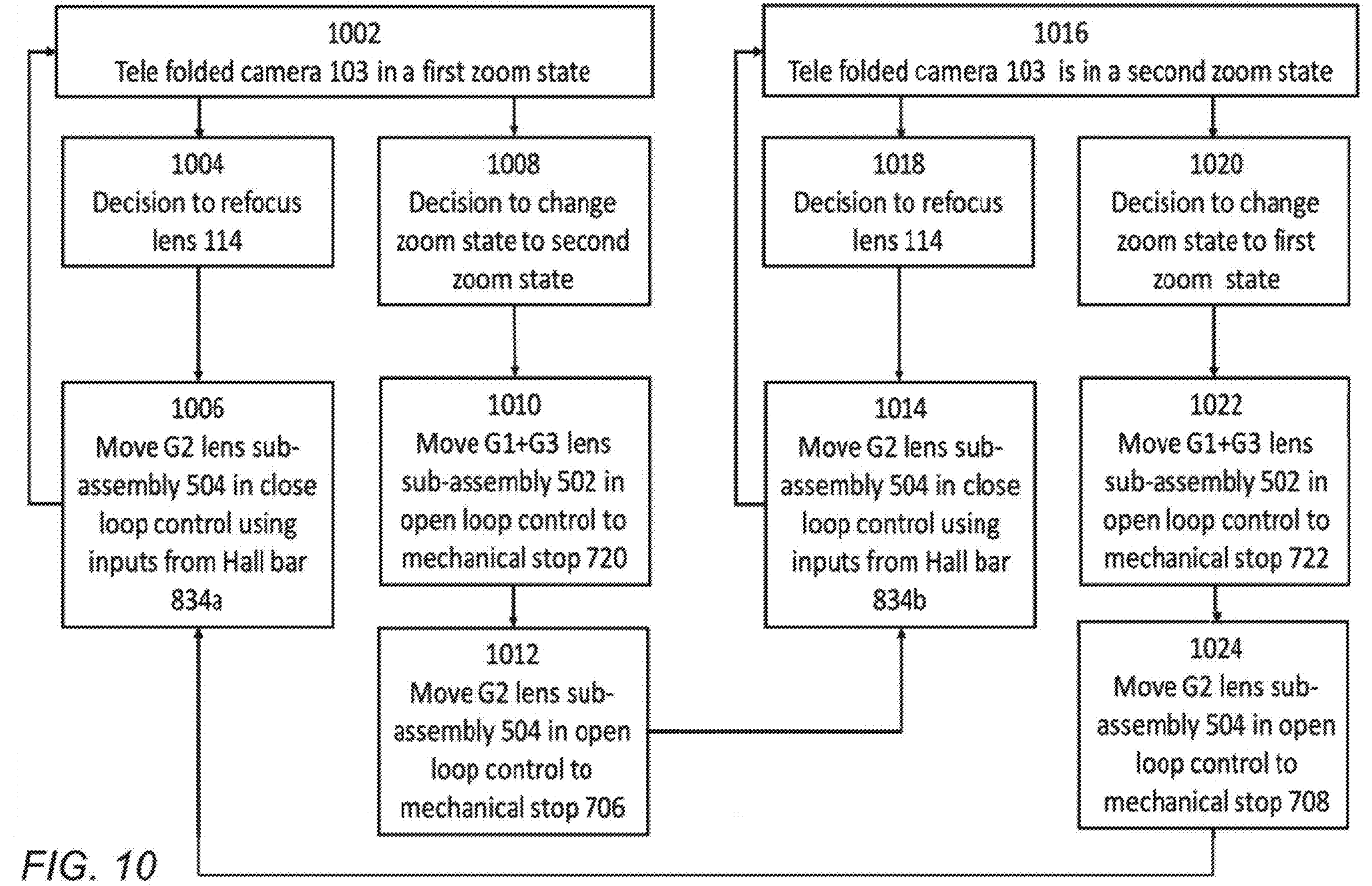
FIG. 10 illustrates in a flow chart an exemplary method for operating a zoom folded camera disclosed herein.

The magneto-electrical design of module 500 allows the following method of operation for operating folded Tele camera 103. FIG. 10 illustrates such an exemplary method in a flow chart. In step 1002, Tele camera 103 is positioned with lens 114 in one (e.g. a first) zoom state. A decision (by a user or an algorithm) to refocus Tele lens 114 is made in step 1004, and G2 lens sub-assembly 504 is moved in step 1006 under closed loop control (by a controller—not shown) using inputs from Hall bar element 834_a_ to bring Tele camera 103 into another focus position in the first zoom state. A decision (by a user or an algorithm) to change the zoom state of lens 114 of camera 103 to another (e.g. a second) zoom state is made in step 1008, and G1+G3 lens sub-assembly 502 is moved under open loop control to mechanical stop 720 in step 1010, followed by movement of G2 lens sub-assembly 504 under open loop control to mechanical stop 706 in step 1012. G2 lens sub-assembly 504 is then moved under closed loop control using inputs from Hall bar element 834_b_ in step 1014, to bring Tele folded camera 103 into the second zoom state in yet another focus position in step 1016. A decision to refocus lens 114 is made in step 1018. The refocusing of lens 114 in the second zoom state is performed by moving G2 lens sub-assembly under closed loop control using inputs from Hall bar element 834_b_. A decision (by a user or an algorithm) to change the second zoom state of lens 114 of camera 103 to the first zoom state is made in step 1020, and G1+G3 lens sub-assembly 502 is moved under open loop control to mechanical stop 722 in step 1022, followed by movement of G2 lens sub-assembly 504 under open loop control to mechanical stop 708 in step 1024.

In some embodiments, the two surfaces $S_{2i-1}$, $S_{2i}$ of any lens element $L_i$ may have two apertures that include two cuts (facets). In such a case, lens element $L_i$ is referred to as a "cut lens element". The cuts enable the lens assembly to be lower and/or shorter. In an example, FIG. 9A shows a lens element 902 having axial symmetry and a height $H_{902}$, and FIG. 9B shows a cut lens element 904 with two cuts 906 and 908 and with height $H_{904}$. Lens elements 902 and 904 have the same diameter D. Evidently $H_{904}<H_{902}$. In an example shown in FIGS. 5, the first two lens elements ($L_1$ and $L_2$) are cut lens elements.

As explained below, a clear height value $CH(S_k)$ can be defined for each surface $S_k$ for $1\le k\le 2N$), and a clear aperture value $CA(S_k)$ can be defined for each surface $S_k$ for $1\le k\le 2N$). $CA(S_k)$ and $CH(S_k)$ define optical properties of each surface $S_k$ of each lens element.

Figure 11A:
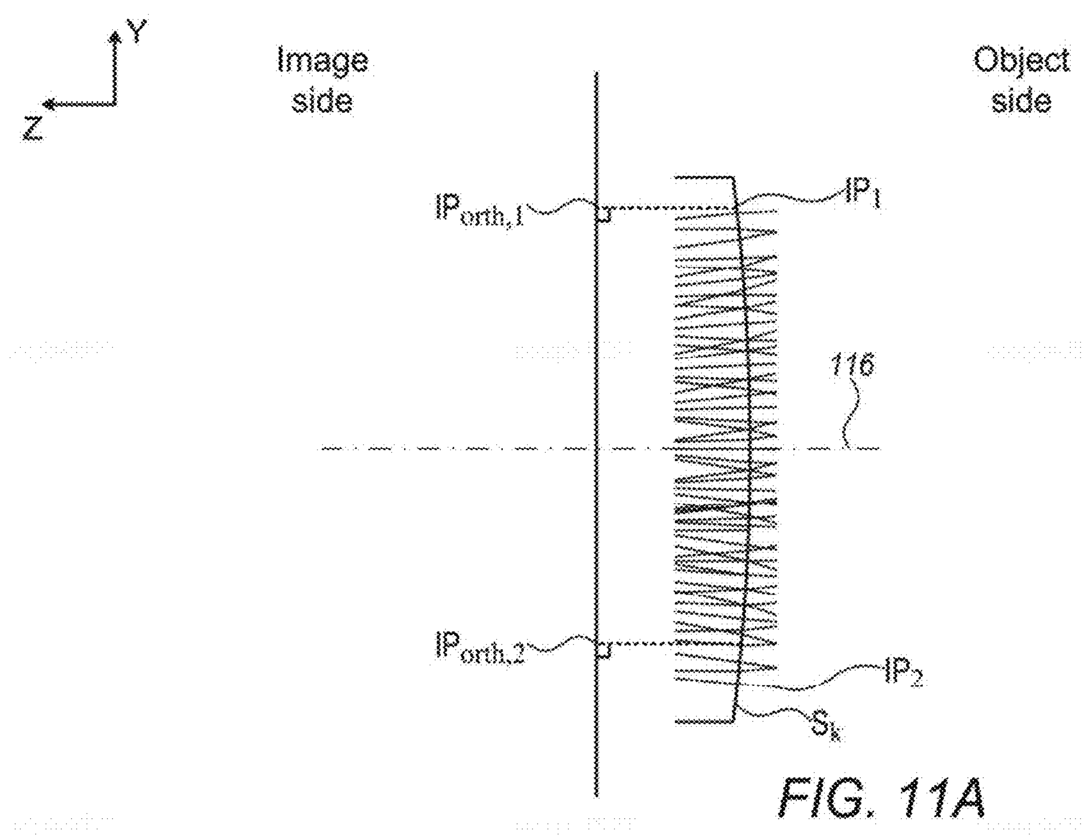
FIG. 11A is a schematic view of impact points of optical rays impinging a convex surface of a lens element, and a schematic view of the orthogonal projection of the impact points on a plane P, according to some examples of the presently disclosed subject matter.
Figure 11B:
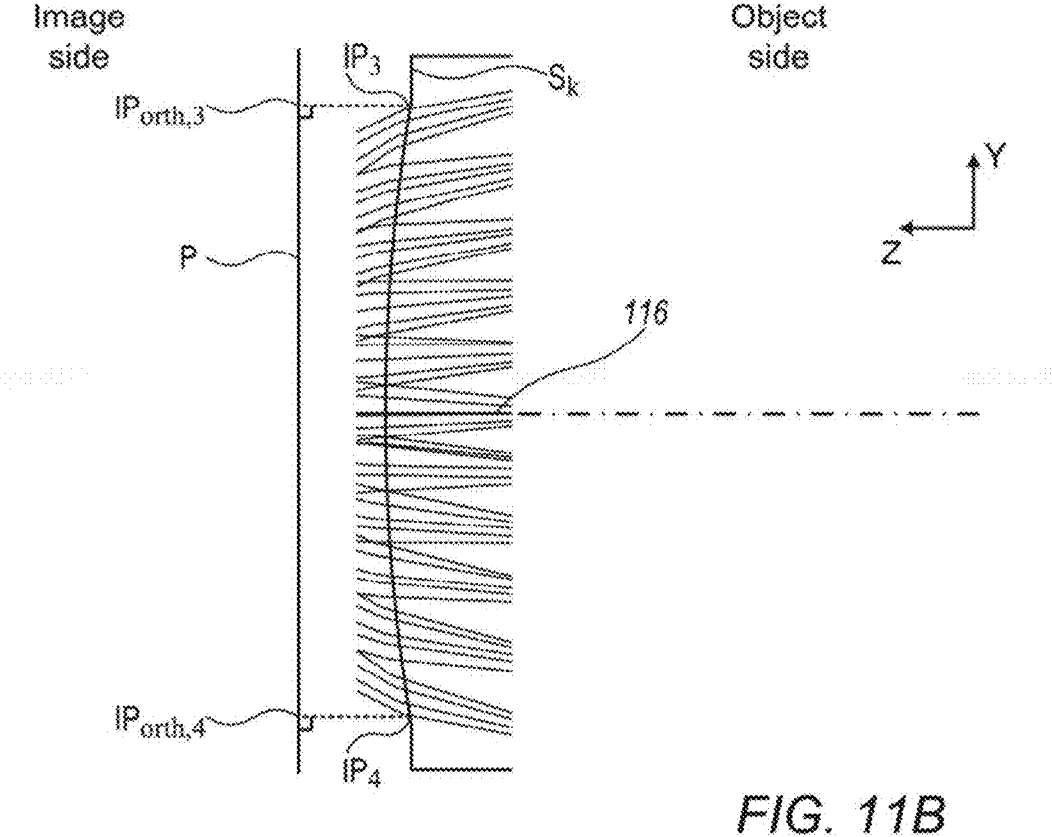
FIG. 11B is a schematic view of impact points of optical rays impinging a concave surface of a lens element, and a schematic view of the orthogonal projection of the impact points on a plane P, according to some examples of the presently disclosed subject matter.
Figure 12:
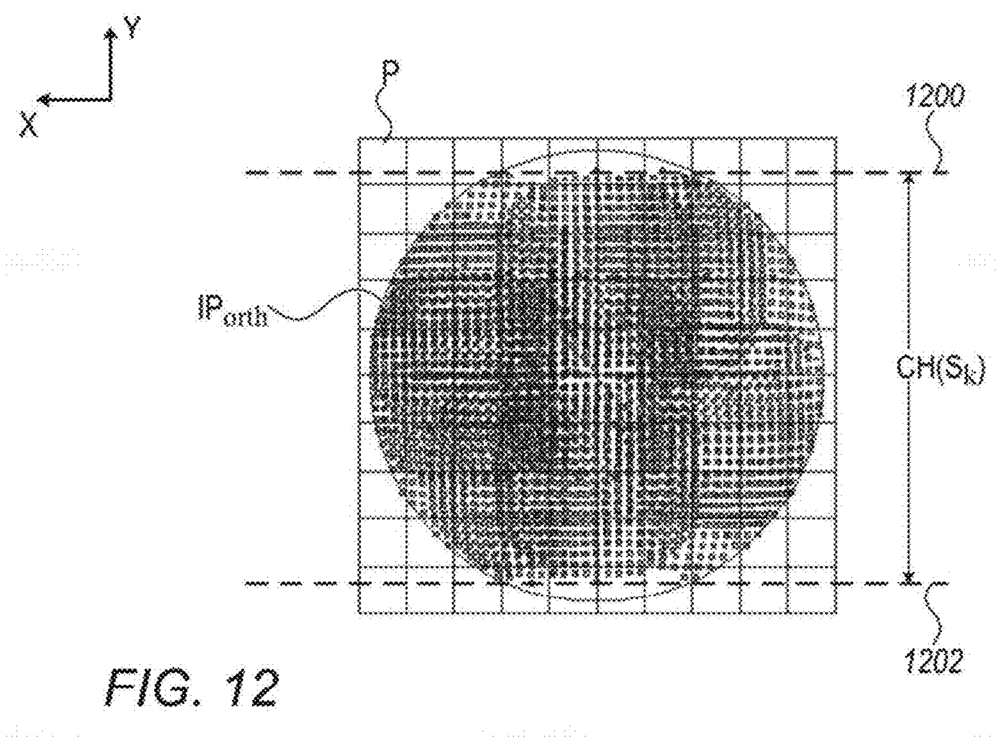
FIG. 12 is a schematic representation of the orthogonal projection of the impact points on a plane P, and of a clear height value ("CH"), according to some examples of the presently disclosed subject matter.

As shown in FIGS. 11A, 11B and 12, each optical ray that passes through a surface $S_k$ (for $1\le k\le 2N$) impinges this surface on an impact point IP. Optical rays enter the lens module (e.g. 114', 114", 114'") from surface $S_1$, and pass through surfaces $S_2$ to $S_{2N}$ consecutively. Some optical rays can impinge on any surface $S_k$ but cannot/will not reach image sensor 118. For a given surface $S_k$, only optical rays that can form an image on image sensor 118 are considered forming a plurality of impact points IP are obtained. $CH(S_k)$ is defined as the distance between two closest possible parallel lines (see lines 1200 and 1202 in FIG. 12 located on a plane P orthogonal to the optical axis of the lens elements (in the representation of FIGS. 11A and 11B, plane P is parallel to plane X-Y and is orthogonal to optical axis 116), such that the orthogonal projection $IP_{orth}$ of all impact points IP on plane P is located between the two parallel lines. $CH(S_k)$ can be defined for each surface $S_k$ (front and rear surfaces, with $1\le k\le 2N$).

The definition of $CH(S_k)$ does not depend on the object currently imaged, since it refers to the optical rays that "can" form an image on the image sensor. Thus, even if the currently imaged object is located in a black background which does not produce light, the definition does not refer to this black background since it refers to any optical rays that "can" reach the image sensor to form an image (for example optical rays emitted by a background which would emit light, contrary to a black background).

For example, FIG. 11A illustrates the orthogonal projections $IP_{orth,1}$, $IP_{orth,2}$ of two impact points $IP_1$ and $IP_2$ on plane P which is orthogonal to optical axis 116. By way of example, in the representation of FIG. 11A, surface $S_k$ is convex.

FIG. 11B illustrates the orthogonal projections $IP_{orth,3}$, $IP_{orth,4}$ of two impact points $IP_3$ and $IP_4$ on plane P. By way of example, in the representation of FIG. 3B, surface $S_k$ is concave.

In FIG. 12, the orthogonal projection $IP_{orth}$ of all impact points IP of a surface $S_k$ on plane P is located between parallel lines 1200 and 1202. $CH(S_k)$ is thus the distance between lines 1200 and 1202.

Figure 13:
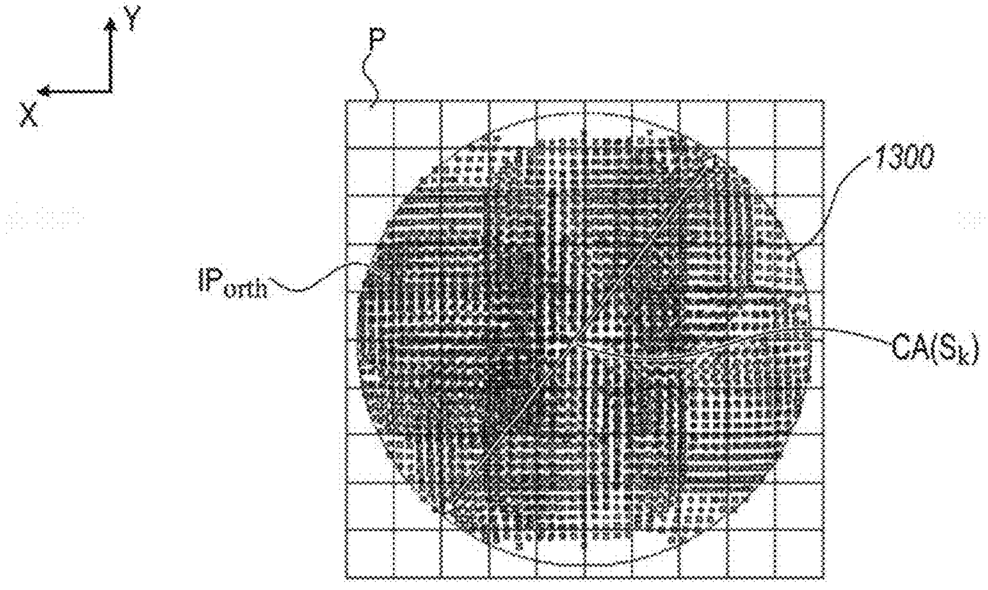
FIG. 13 is a schematic representation of the orthogonal projection of the impact points on a plane P, and of a clear aperture, according to some examples of the presently disclosed subject matter.

Attention is drawn to FIG. 13. According to the presently disclosed subject matter, a clear aperture $CA(S_k)$ is defined for each given surface $S_k$ (for $1\le k\le 2N$), as the diameter of a circle, wherein the circle is the smallest possible circle located in a plane P orthogonal to the optical axis 116 and encircling all orthogonal projections $IP_{orth}$ of all impact points on plane P. As mentioned above with respect to $CH(S_k)$, it is noted that the definition of $CA(S_k)$ also does not depend on the object which is currently imaged.

As shown in FIG. 13, the circumscribed orthogonal projection $IP_{orth}$ of all impact points IP on plane P is circle 1300. The diameter of this circle 1300 defines $CA(S_k)$.

In conclusion, zoom cameras disclosed herein are designed to overcome certain optical challenges as follows:

A lens design where $EFL_{Tmax}>1.8\times EFL_{Tmin}$ or $EFL_{Tmax}>1.5\times EFL_{Tmin}$ insures significant user experience effect to the mechanical zoom.

In some embodiments (e.g. Example 1), $TTL_{Tmax}<EFL_{Tmax}$. In some embodiments (e.g. Examples 2 and 3), $TTL_{Tmax}<0.9\times EFL_{Tmax}$. Such a lens design may reduce camera length (along the Z axis).

In some embodiments (Examples 1-3), the first lens element has a clear aperture (diameter of S1) larger than that of all other lens element clear apertures. In some embodiments (module 500), the first lens has a first lens which is cut lens element, see FIG. 9. Advantageously such a lens design helps to achieve small camera height.

Change in zoom state is caused by no more than two actual amounts of lens group movements. That is, to change zoom state, some lens element groups move together in a first movement range, then some of the remaining lens group elements move together by in a second movement range and all other lens element groups do not move. This simplifies actuator control and design, since there is a need to move and control only two mechanical elements.

In another example (Example 2) of a process to change zoom state, G1 together with G3 move by a first amount and G2 moves by a second amount. Farther movement of G2 can be used for focusing.

In yet another example (Example 3) of a process to change zoom state, G1 moves by a first amount, G3 moves by a second amount and G2 does not move. Further movement of first G1 can be used for focusing.

In yet another example (Example 4) of a process to change zoom state, G1 together with G3 move and G2 does not move. Further movement of first G2 can be used for focusing.

In yet another example (Example 5) of a process to change zoom state, G1 together with G3 move and G2 does not move. Further movement of G1 together with G3 can be used for focusing.

In yet another example (Example 6) of a process to change zoom state, G1 together with G3 move by a first amount and G2 moves by a second amount. Further movement of all three lens groups together, so G1 and G2 and G3 moving together, can be used for focusing.

Table 25 summarizes the movements in each Example, with exemplary movement ranges:

TABLE 25

| | Example 1 | Example 2 | Example 3 | Example 4 | Example 5 | Example 6 |
|---|---|---|---|---|---|---|
| G1 range [mm] | 11.272 | 7.52 | 10.18 | 7.065 | 7.697 | 5.641 |
| G2 range [mm] | Static | 1.575 | Static | Static | Static | 0.718 |
| G3 range [mm] | 5.02 | 7.52 | 6.0 | 7.065 | 7.697 | 5.641 |
| Group moving for focus | G3 | G2 | G1 | G2 | G1 + G3 | G1 + G2 + G3 |
| AF max range [mm] | 0.375 | 0.525 | 0.68 | 0.723 | 1.742 | 0.342 |

In some examples, $F\#_{Tmin}<1.5\times F\#_{Tmax}\times EFL_{Tmin}/EFL_{Tmax}$. In some examples, $F\#_{Tmin}<1.2\times F\#_{Tmax}\times EFL_{Tmin}/EFL_{max}$ Such a lens design may achieve low F # for the first state.

In some examples, for any lens element group, the movement from the first zoom state to the second zoom state has a stroke smaller than $0.75\times(EFL_{Tmax}-EFL_{Tmin})$. In some examples, for any lens element group, the movement from the first zoom state to the second zoom state has a stroke smaller than $0.6\times(EFL_{Tmax}-EFL_{Tmin})$. Such a lens design may limit lens elements movement and/or simplify actuation.

Focusing can be performed by further movement of one of the lens element groups that moves together for zoom state change, simplifying actuator design and improving control.

In terms of properties of lenses disclosed herein:

a lens design with 3 lens groups minimizes lens complexity.

a lens design with lens groups having (starting from the object side) positive, positive and negative power, may contribute to a small lens group movement for zoom state change.

In one example (Example 1) of a process to change zoom state, the first lens element group G1 moves by a first amount and the third lens element group G3 moves by a second amount, while the second lens element group G2 does not move. Farther movement of G3 can be used for focusing.

Examples presented in Table 25 where more than one lens group is indicated as moving for focus may refer to a design where the lens groups defined in the table move together as one unit for focus. In some embodiments (e.g. Examples 5 and 6), moving several lens groups together may be facilitated by coupling the respective lens groups rigidly.

The values given in G1 range, G2 range and G3 range refer to the maximal range of overall movement of the lens groups with respect to the image sensor.

The values given in row "AF max range" refer to the maximal range of movement of the lens groups with respect to the image sensor defined in row "Group moving for focus" required for focusing between infinity and 1 meter or 2 meter according to the respective relevant table of table 2, 6, 10, 14, 18, 22 see above. In most embodiments, the AF max range is given by the lens group movement for the higher zoom state, i.e. the state with $EFL_{Tmax}$.

In some embodiments, G1 and G3 may be in a stationary state, i.e. G1 and G3 do not move, whereas G2 may be moved in order to change zoom state.

Figure 14:
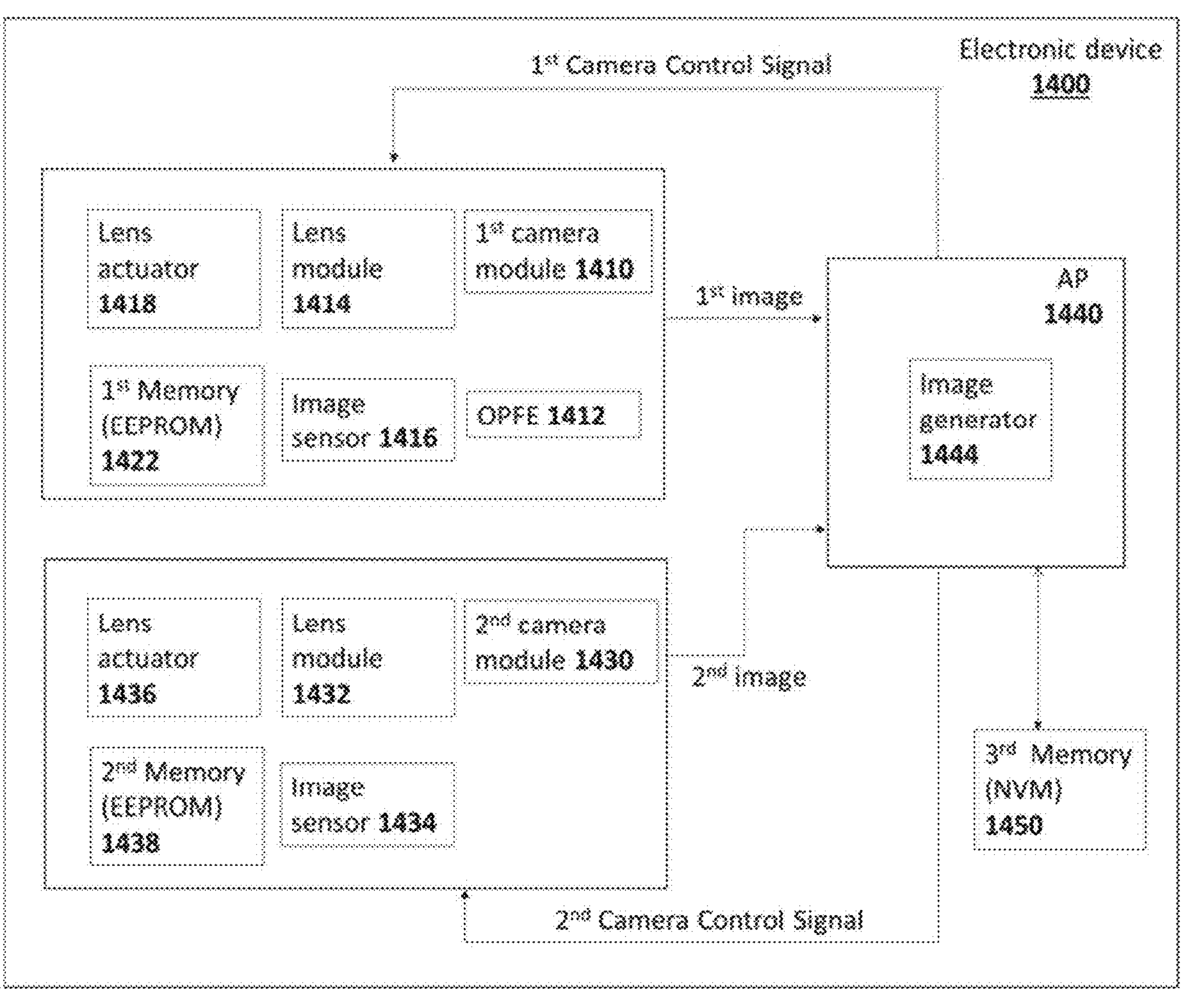
FIG. 14 shows schematically in a block diagram an embodiment of a system disclosed herein.

FIG. 14 shows schematically an embodiment of an electronic device numbered 1400 and including multi-aperture cameras with at least one multi-zoom state camera disclosed herein. Electronic device 1400 comprises a first camera module 1410 that includes an OPFE 1412, and a first lens module 1414 that forms a first image recorded by a first image sensor 1416. A first lens actuator 1418 may move lens module 1414 for focusing and/or optical image stabilization (OIS) and/or for changing between two different zoom states. In some embodiments, electronic device 1400 may further comprise an application processor (AP) 1440. In some embodiments, a first calibration data may be stored in a first memory 1422 of a camera module, e.g. in an EEPROM (electrically erasable programmable read only memory). In other embodiments, a first calibration data may be stored in a third memory 1450 such as a NVM (non-volatile memory) of the electronic device 1400. The first calibration data may include one or more subsets of calibration data, e.g. a first subset comprising calibration data between sensors of a Wide and a Tele camera in a first zoom state, and/or a second subset comprising calibration data between sensors of a Wide and a Tele camera in a second zoom state, and/or a third subset comprising calibration data between a sensor of a Tele camera in a first zoom state and the same sensor in a second zoom state. Electronic device 1400 further comprises a second camera module 1430 that includes a second lens module 1432 that forms an image recorded by a second image sensor 1434. A second lens actuator 1436 may move lens module 1432 for focusing and/or OIS and/or for changing between two different zoom states. In some embodiments, second calibration data may be stored at a second memory 1438 of a camera module. In other embodiments, the second calibration data may be stored in a third memory 1450 of the electronic device 1400. The second calibration data may include one or more subsets of calibration data, e.g. as described above.

In use, a processing unit such as AP 1440 may receive respective first and second image data from camera modules 1410 and 1430 and supply camera control signals to the camera modules 1410 and 1430. In some embodiments, AP 1440 may receive calibration data from a third memory 1450. In other embodiments, an AP 1440 may receive calibration data stored respective in a first memory located on camera module 1410 and in a second memory located on camera module 1430. In yet another embodiment, AP 1440 may receive calibration data stored respective in a first memory located on camera module 1410 and in a second memory located on camera module 1430, as well as from a third memory 1450 of an electronic device 1400. In some embodiments, an electronic device like device 1400 may comprise more than one camera module realized in a folded lens design and with an OPFE. In other embodiments, two or more camera modules may be realized without an OPFE and not with a folded lens design structure, but with another lens design structure. AP 1440 may have access to data stored in third memory 1450. This data may comprise a third calibration data. An image generator 1444 may be a processor configured to output images based on calibration data and-image data. Image generator 1444 may process a calibration data and an image data in order to output an output image.

Camera calibration data may comprise:

- Stereo calibration data between camera modules 1410 and 1430, specifically for all possible combinations of different lenses and different lens zoom states, e.g. of two different zoom states of a Tele camera. The stereo calibration data may include 6 degrees of freedom, e.g. pitch, yaw and roll angles, and decenter in x, y and z axes.
- Stereo calibration data between camera modules 1410 and 1430, specifically for all possible combinations of different zoom states, e.g. of two different zoom states of a Tele camera. These data may include 6 degrees of freedom.
- Intrinsic camera parameters, such as focal length and distortion profile for each camera module and for each of the different zoom states, e.g. of two different zoom states of a Tele camera.
- Hall-sensor position values that may correspond to different focus positions in each of the different zoom states (e.g. infinity, 1 m and closest focus).
- Lens shading profiles of the lens modules for each of the different zoom states.

Figure 15A:
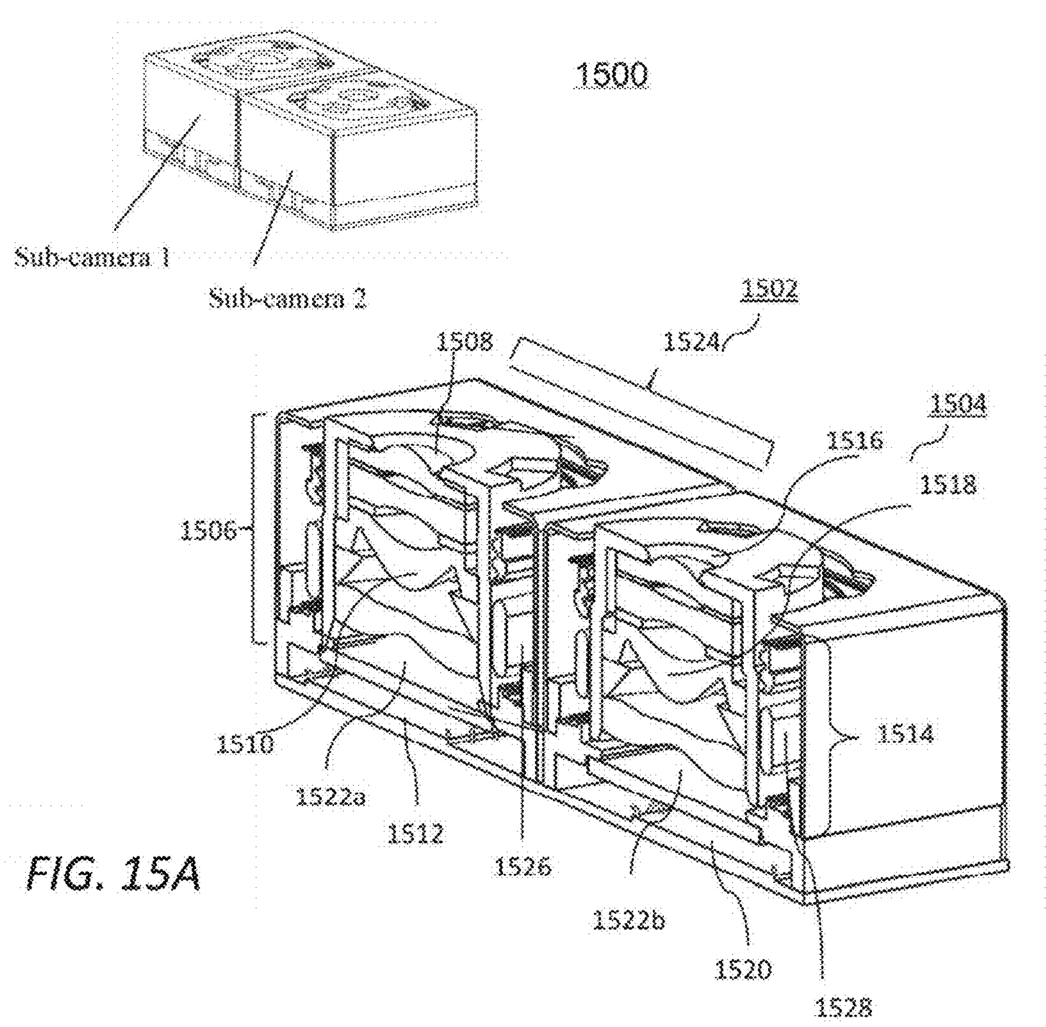
FIGS. 15A, 15B and 15C show schematically designs of dual-aperture cameras and triple-aperture cameras comprising folded and non-folded lens designs.

FIG. 15A shows schematically an embodiment of a dual-aperture zoom camera with auto-focus AF and numbered 1500, in a general isometric view, and a sectioned isometric view. Camera 1500 comprises two sub-cameras, labeled 1502 and 1504, each sub-camera having its own optics. Thus, sub-camera 1502 includes an optics bloc 1506 with an aperture 1508 and an optical lens module 1510, as well as a sensor 1512. Similarly, sub-camera 1504 includes an optics bloc 1514 with an aperture 1516 and an optical lens module 1518, as well as a sensor 1520. Each optical lens module may include several lens elements as well as an Infra-Red (IR) filter 1522*a* and 1522*b*. Optionally, some or all of the lens elements belonging to different apertures may be formed on the same substrate. The two sub-cameras are positioned next to each other, with a baseline 1524 between the center of the two apertures 1508 and 1516. Each sub-camera can further include an AF mechanism and/or a mechanism for optical image stabilization (OIS), respectively 1526 and 1528, controlled by a controller (not shown).

Figure 15B:
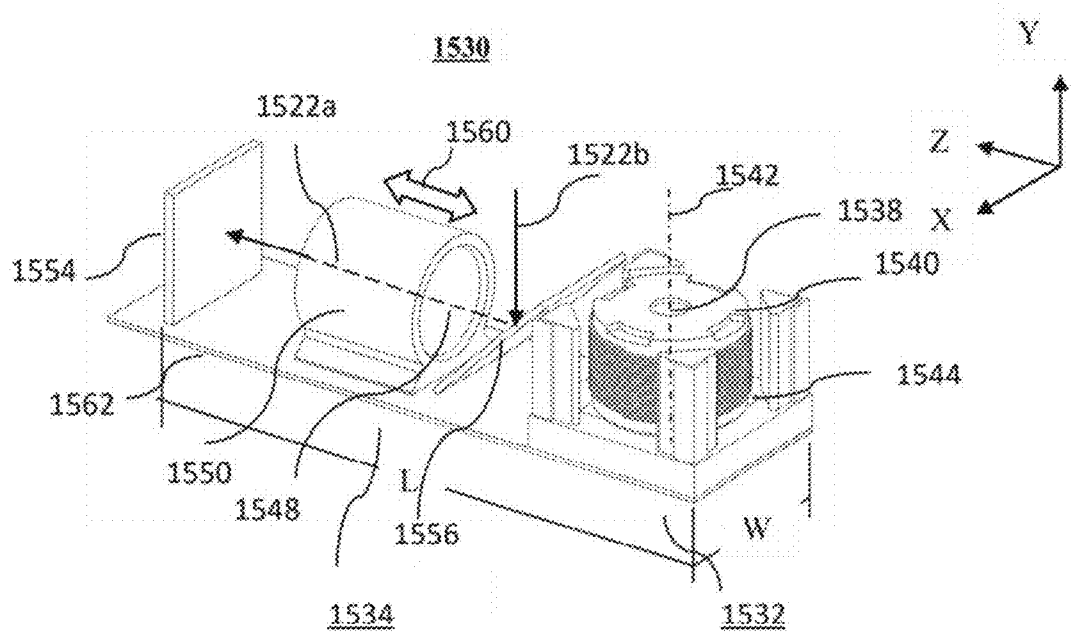

FIG. 15B shows schematically an embodiment of a zoom and auto-focus dual-aperture camera 1530 with folded Tele lens in a sectioned isometric view related to a XYZ coordinate system. Camera 1530 comprises two sub-cameras, a Wide sub-camera 1532 and a Tele sub-camera 1534. Wide camera 1532 includes a Wide optics bloc with a respective aperture 1538 and a lens module 1540 with a symmetry (and optical) axis 1542 in the Y direction, as well as a Wide image sensor 1544. Tele camera 1534 includes a Tele optics bloc with a respective aperture 1548 and an optical lens module 1550 with a Tele lens symmetry (and optical) axis 1552*a*, as well as a Tele sensor 1554. Camera 1530 further comprises an OPFE 1556. The Tele optical path is extended from an object (not shown) through the Tele lens to the Tele sensor and marked by arrows 1552*b* and 1552*a*. Various camera elements may be mounted on a substrate 1562 as shown here, e.g. a printed circuit board (PCB), or on different substrates (not shown).

Figure 15C:
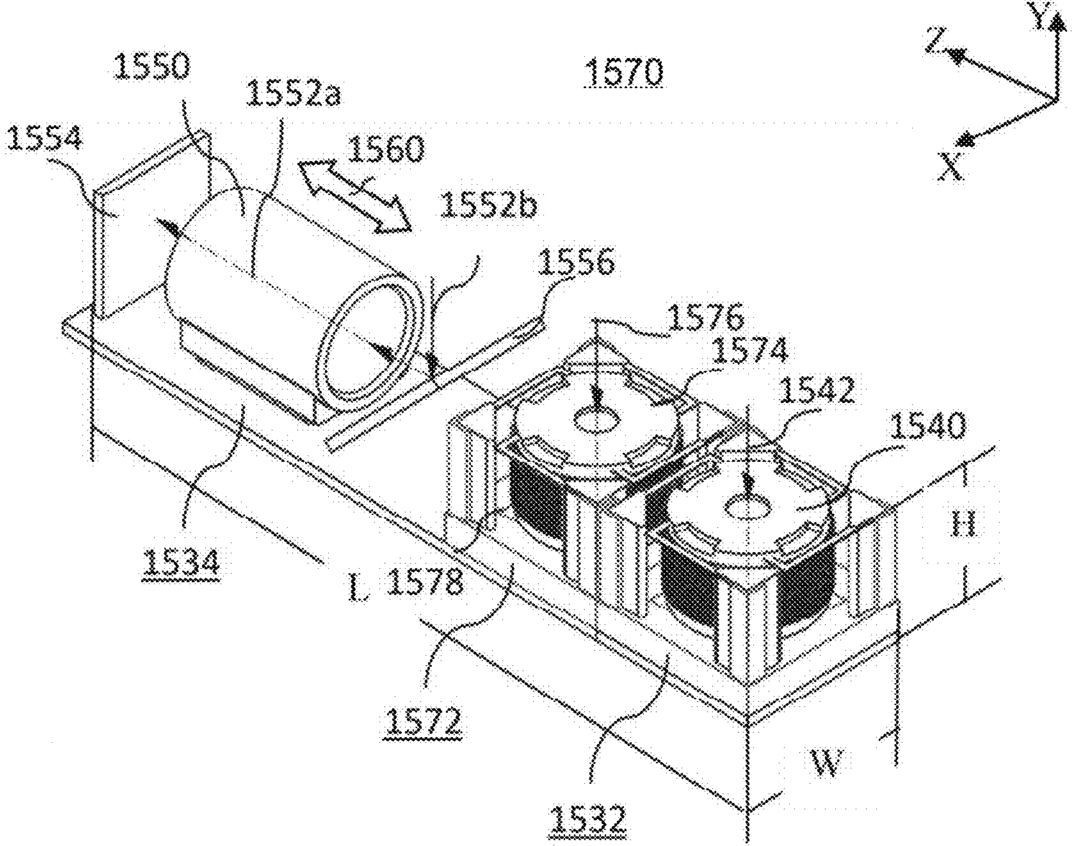

FIG. 15C shows schematically an embodiment in a general isometric view of a zoom and auto-focus triple-aperture camera 1570 with one folded Tele sub-camera 1534. Camera 1570 includes for example elements and functionalities of camera 1530. That is, camera 1570 includes a Wide sub-camera 1532, a Tele sub-camera 1534 with an OPFE 1556. Camera 1570 further includes a third sub-camera 1572 which may be an Ultra-Wide camera with an Ultra-Wide lens 1574 and an image sensor 1578. In other embodiments, third sub-camera 1572 may have an $EFL_M$ and a $FOV_M$ intermediate to those of the Wide and Tele sub-cameras. A symmetry (and optical) axis 1576 of the third sub-camera is substantially parallel to axis 1542 sub-camera 1532. Note that while the first and the third sub-cameras are shown in a particular arrangement (with third sub-camera 1572 closer to Tele sub-camera 1534), this order may be changed such that the Wide and the Ultra-Wide sub-cameras may exchange places.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A dual-camera, comprising:

a Wide camera comprising a Wide lens having a Wide effective focal length (EFLW); and a folded Tele camera, comprising a Tele lens comprising a plurality of lens elements and having an optical axis, an image sensor, and an optical path folding element (OPFE), wherein the Tele lens includes, from an object side to an image side, a first lens element group (G1), a second lens element group (G2) and a third lens element group (G3), wherein the lens elements within a lens group do not move with respect to each other, wherein the Tele lens is located between the OPFE and the image sensor, wherein at least two of the lens element groups are movable relative to the image sensor along the optical axis to bring the Tele lens to two, first and second zoom states, wherein an effective focal length (EFL) of the Tele lens is changed from a value (EFLmin) in the first zoom state to a value (EFLmax) in the second zoom state, wherein EFLmin>1.5×EFLW, wherein the plurality of lens elements have a maximum clear aperture height (CA), wherein the folded camera is included in a folded camera module having a folded camera module height (HM) ≤CA+3.9 mm, and wherein the dual-camera is included in a mobile device.

2. The dual-camera of claim 1, wherein HM≤CA+3.5 mm.

3. The dual-camera of claim 1, wherein HM≤CA+3 mm.

4. The dual-camera of claim 1, wherein HM≤CA+2.5 mm.

5. The dual-camera of claim 1, wherein HM≤CA+2 mm.

6. The dual-camera of claim 1, wherein HM≥CA+1.3 mm.

7. The dual-camera of claim 1, wherein one of the lens groups is stationary relative to the Tele image sensor between the two zoom states at infinity focus.

8. The dual-camera of claim 1, wherein the Tele lens has a f-number (F #) and wherein a minimal value (F #min) of F # in the first zoom state fulfills F #min<3.

9. The dual-camera of claim 8, wherein F #min<2.5.

10. The dual-camera of claim 8, wherein F #min≤2.

11. The dual-camera of claim 1, wherein the Tele lens has a f-number (F #) and wherein a maximal value (F #max) of F # in the second zoom state fulfills F #max<4.5.

12. The dual-camera of claim 1, wherein G1 has a positive refractive power, G2 has a positive refractive power and G3 has a negative refractive power.

13. The dual-camera of claim 1, wherein 20 mm≤EFLmax≤40 mm and 10 mm≤EFLmin≤20 mm.

14. The dual-camera of claim 1, wherein a first lens element (L1) of the plurality of N lens elements faces an object side and has a (CA) value larger than a (CA) value of any other of the N lens elements.

15. The dual-camera of claim 1, wherein for any lens element group, movement from the first zoom state to the second zoom state has a range smaller than 0.6×(EFLmax−EFLmin).

16. The dual-camera of claim 1, wherein the lens has a f-number (F #) and wherein a minimal value (F #min) of F # and a maximal value (F #max) of F #fulfill the condition F #min<1.5×F #max×EFLmin/EFLmax.

17. The dual-camera of claim 1, wherein the lens has a total track length (TTL) and wherein a maximal value (TTLmax) of the TTL fulfills the condition TTLmax<EFLmax.

18. The dual-camera of claim 1, wherein the movement of lens element groups along the optical axis is guided by a ball guided mechanism that creates a linear rail parallel to the optical axis.

19. The dual-camera of claim 1, wherein the movement of lens element groups along the optical axis is actuated using voice coil motor mechanisms.

20. The dual-camera of claim 1, wherein the mobile device is a smartphone.

* * * * *